US008639618B2

(12) United States Patent
Yan et al.

(10) Patent No.: US 8,639,618 B2
(45) Date of Patent: *Jan. 28, 2014

(54) SYSTEM AND METHOD OF DETECTING AND ASSESSING MULTIPLE TYPES OF RISKS RELATED TO MORTGAGE LENDING

(71) Applicant: Corelogic Solutions, LLC, Irvine, CA (US)

(72) Inventors: Rui Yan, La Mesa, CA (US); Hoi-Ming Chi, Vista, CA (US); Seongjoon Koo, San Diego, CA (US); James Baker, Bremerton, WA (US)

(73) Assignee: CoreLogic Solutions, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/933,568

(22) Filed: Jul. 2, 2013

(65) Prior Publication Data

US 2013/0332338 A1    Dec. 12, 2013

Related U.S. Application Data

(63) Continuation of application No. 12/687,098, filed on Jan. 13, 2010, now Pat. No. 8,489,499.

(51) Int. Cl.
*G06Q 40/00* (2012.01)
(52) U.S. Cl.
USPC .......................................................... 705/38
(58) Field of Classification Search
USPC .............................................................. 705/38
See application file for complete search history.

(56) References Cited

U.S. PATENT DOCUMENTS

| 5,819,226 | A  | 10/1998 | Gopinathan et al. |
| 5,940,812 | A  | 8/1999  | Tengel et al.     |
| 6,134,532 | A  | 10/2000 | Lazarus et al.    |
| 6,185,543 | B1 | 2/2001  | Galperin et al.   |
| 6,330,546 | B1 | 12/2001 | Gopinathan et al. |
| 6,430,539 | B1 | 8/2002  | Lazarus et al.    |

(Continued)

FOREIGN PATENT DOCUMENTS

| CA | 1252566 | 4/1989 |
| CA | 2032126 | 8/1993 |

(Continued)

OTHER PUBLICATIONS

Doumpos et al.: Model combination for credit assessment: a stacked generalization approach, 2007, Annals of Operation Research 151, pp. 289-306.*

(Continued)

*Primary Examiner* — Bijendra K Shrestha
(74) *Attorney, Agent, or Firm* — Knobbe, Martens, Olson & Bear, LLP

(57) ABSTRACT

Embodiments include systems and methods of detecting and assessing multiple types of risks related to mortgage lending. One embodiment includes a system and method of detecting and assessing risks including fraud risks, early payment default risks, and risks related to fraudulently stated income on loan applications. One embodiment includes a computerized method that includes creating a combined risk detection model based on a plurality of risk detection models and using the combined risk detection model to evaluate loan application data and generate a combined risk score that takes into account interaction of different types of risks individually and collectively detected by the plurality of risk detection models.

19 Claims, 16 Drawing Sheets

(56) References Cited

U.S. PATENT DOCUMENTS

| | | |
|---|---|---|
| 6,658,393 B1 | 12/2003 | Basch et al. |
| 6,728,695 B1 | 4/2004 | Pathria et al. |
| 6,839,682 B1 | 1/2005 | Blume et al. |
| 7,165,037 B2 | 1/2007 | Lazarus et al. |
| 7,386,528 B2 | 6/2008 | Maloche et al. |
| 7,392,216 B1 | 6/2008 | Palmgren et al. |
| 7,587,348 B2 | 9/2009 | Liao et al. |
| 7,966,256 B2 | 6/2011 | Liao et al. |
| 8,065,234 B2 | 11/2011 | Liao et al. |
| 8,121,920 B2 | 2/2012 | Liao et al. |
| 8,489,499 B2 | 7/2013 | Yan et al. |
| 2002/0111725 A1 | 8/2002 | Burge |
| 2002/0133371 A1 | 9/2002 | Cole |
| 2002/0133721 A1 | 9/2002 | Adjaoute |
| 2002/0194119 A1 | 12/2002 | Wright et al. |
| 2003/0093366 A1 | 5/2003 | Halper et al. |
| 2004/0010443 A1 | 1/2004 | May et al. |
| 2004/0236696 A1 | 11/2004 | Aoki et al. |
| 2005/0108025 A1 | 5/2005 | Cagan |
| 2006/0059073 A1 | 3/2006 | Walzak |
| 2006/0149674 A1 | 7/2006 | Cook et al. |
| 2008/0154679 A1 | 6/2008 | Wade |
| 2009/0222248 A1 | 9/2009 | Grichnik et al. |
| 2009/0292568 A1 | 11/2009 | Khosravani et al. |
| 2009/0299896 A1 | 12/2009 | Zhang et al. |

FOREIGN PATENT DOCUMENTS

| | | | |
|---|---|---|---|
| CA | 2052033 | 1/1999 | |
| EP | 1450321 | 8/2004 | |
| WO | WO 01/77959 A1 | 10/2001 | |
| WO | WO 02/37219 * | 5/2002 | |
| WO | WO 02/37219 A2 | 5/2002 | |
| WO | WO 02/097563 A2 | 12/2002 | |
| WO | WO 2006/072011 * | 7/2006 | ............... G06G 7/48 |
| WO | WO 2007/002702 A2 | 1/2007 | |

OTHER PUBLICATIONS

Olmeda et al.: Hybrid classifiers for financial multicriteria decision making: The case of bankruptcy prediction, 1997, Computational Economics, 10, pp. 317-335.*

"Fraud Detection in the Financial Industry", A SAS Institute Best Practices Paper, 32 pages, Apr. 2000.

Garavaglia, Susan, "An Application of a Counter-Propagation Neural Network: Simulating the Standard & Poor's Corporate Bond Rating System", IEEE 1991, pp. 278-287, Oct. 1991.

Congressional Testimony of Chris Swecker, Assistant Director, Criminal Investigative Division, Federal Bureau of Investigation, before the House Financial Services Subcommittee on Housing and Community Opportunity, Oct. 7, 2004, 5 pages.

"New Business Uses for Neurocomputing", I/S ANALYZER, Feb. 1990, vol. 28, No. 2, 15 pages.

Ghosh, Sushmito and Reilly, Douglas L.., "Credit Card Fraud Detection with a Neural-Network", IEEE 1994, pp. 621-630, Jan. 1994.

Neal, Mark, Hunt, John and Timmis, Jon, "Augmenting an Artificial Immune Network", IEEE 1998, pp. 3821-3826, Jan. 1998.

Klimasauskas, Casimir C., "Neural Networks: a Short Course", PC AI, Nov./Dec. 1988, pp. 26-30.

Klimasauskas, Casimir C., "Applying Neural Networks Part 1: An Overview of the Series", PC AI, Jan. Feb. 1991, pp. 30-33.

Klimasauskas, Casimir C., "Applying Neural Networks Part 2: A Walk Through the Application Process", PC AI, Mar./Apr. 1991, pp. 27-34.

Klimasauskas, Casimir C., "Applying Neural Networks Part III: Training a Neural Network", PC AI, May/Jun. 1991, pp. 20-24.

Klimasauskas, Casimir C., "Applying Neural Networks Part IV: Improving Performance", PC AI Jul./Aug. 1991, pp. 34-41.

Klimasauskas, Casimir C., "Applying Neural Networks Part V: Integrating a Trained Network into an Application", PC AI Sep./Oct. 1991, pp. 36-41.

Klimasauskas, Casimir C., "Applying Neural Networks Part VI: Special Topics", PC AI Nov./Dec. 1991, pp. 46-49.

U.S. Appl. No. 11/864,606, filed Sep. 28, 2007.

Jonathan Killin. "Combatting credit card fraud with knowledge based systems." In Compsec 90 International. Elsevier Advanced Technology, pp. 215-224, Oct. 1990.

Olmeda et al., "Hybrid classifiers for financial multicriteria decision making: The case of bankruptcy prediction", 1997, Computational Economics, vol. 10, pp. 317-335.

Doumpos et al., "Model combination for credit assessment: a stacked generalization approach", Nov. 10, 2006, Annals of Operation Research 151, pp. 289-306.

* cited by examiner

| USER ENTRY INFORMATION | |  HIGH RISK COMBINED SCORE: 990 |
|---|---|---|
| LOAN NUMBEER | 26315269 | |
| PROPERTY ADDRESS | 45540 SIERRA DRIVE | |
| INCOME | $15,127 | |
| BORROWER | JAMES SMITH | |
| PROPERTY CITY, STATE, ZIP | INDIAN WELLS, CA, 92210 | |
| DATE OF BIRTH | 8/13/1966 | |

⚠ COMBINED FRAUD ALERTS

| | SEVERITY | MESSAGE | RECOMMENDATIONS |
|---|---|---|---|
| INCOME & EMPLOYMENT | ⊗ | THE STATED INCOME FAILS MULTIPLE SOUNDNESS TESTS. VERIFICATION IS RECOMMENDED | REQUEST WRITTEN VOE, SIGNED 4506T AND 2 YRS 1040'S. BORROWER INCOME IN HIGHER RANGE FOR GEOGRAPHIC AREA MEDIUM EMPLOYER |
| | ▽ | BORROWER INCOME IN HIGHER RANGE FOR GEOGRAPHIC AREA | -- |
| | ▢ | EMPLOYER PHONE NUMBER IS A CELL PHONE | VERIFY ALL DATA WAS ENTERED CORRECTLY. REQUEST WRITTEN VOE WITH EXPLANATION. SEARCH FOR EMPLOYER PHONE NUMBER USING AN APPROVED THIRD PARTY SEARCH TOOL. PERFORM VERBAL VOE. |
| | ▽ | INCOME IS CONSISTENT WITH HIGH NET WORTH CUSTOMER | -- |
| PROPERTY ⌂ | ⊗ | MARKET HAS EXPERIENCED LONG TERM DEPRECIATION | THOROUGH APPRAISAL REVIEW TO ENSURE VALUE IS SUPPORTED |
| | ⊗ | THE SCORE INDICATES THAT THIS LOAN IS AT THE HIGHEST RISK LEVEL FOR PERFORMANCE ISSUES AND POTENTIAL LOSS SEVERITY | REFER TO YOUR GUIDELINES PERTAINING TO REQUIRED ACTION STEPS ON HIGH COLLATERAL RISK LOANS. |
| | ▢ | PROPERTY VALUE IN HIGHER RANGES FOR GEOGRAPHIC AREA | -- |
| | ▢ | WIDE VARIATION IN NEARBY SALES PRICES | -- |
| | ▽ | PROPERTY IS IN A HIGH FRAUD RATE AREA | -- |
| | ▢ | VALUE INCONSISTENCIES | -- |
| IDENTITY 🔍 | ▢ | BORROWER'S CURRENT ADDRESS COULD NOT BE VERIFIED | VERIFY ADDRESS WAS ENTERED CORRECTLY. IF ENTERED CORRECTLY, OBTAIN PROOF OF RESIDENCY. |
| BORROWER & OCCUPANCY | ▢ | LOW PROBABILITY THAT SUBJECT PROPERTY WILL BE OWNER OCCUPIED | REQUEST PROOF OF OCCUPANCY. COMPARE SUBJECT PROPERTY TO CURRENT OWNED PROPERTIES FOR INCONSISTENCIES IN MARKETS AND SQUARE FOOTAGE. |
| | ▢ | BORROWER HAS PURCHASED AN UNUSUALLY HIGH AMOUNT OF PROPERTY | REQUEST LOE FROM BORROWER, 4506T AND 2 YRS 1040'S. THOROUGH REVIEW OF SCHED E. ENSURE DTI IS WITHIN GUIDELINES. REVIEW CREDIT INQUIRIES. |
| | ▽ | BORROWER CURRENTLY OWNS MULTIPLE PROPERTIES | VERIFY ALL PROPERTIES WERE DISCLOSED ON THE 1003. REQUEST 4506T AND 2 YRS 1040'S. THOROUGH REVIEW SCHED E. ENSURE DTI IS WITHIN GUIDELINES. |
| FRAUD SCORE RISK | ⊗ | HIGH RISK OF FRAUD AND PROPERTY VALUATION ISSUES IN LOAN FILE | PERFORM VERIFICATION OF INCOME, EMPLOYMENT, OCCUPANCY AND VALUATION AND REVIEW DOCUMENTATION FOR AUTHENTICITY. |

SEVERITY: ⊗ HIGH RISK   ▢ MODERATE RISK   ▽ LOW RISK

NOTES: THE LOANSAFE REPORT FOLLOWS

*FIG. 4*

SYSTEM AND METHOD OF DETECTING AND ASSESSING MULTIPLE TYPES OF RISKS RELATED TO MORTGAGE LENDING

CROSS-REFERENCE TO RELATED APPLICATIONS

This application is a continuation of U.S. patent application Ser. No. 12/687,098, filed Jan. 13, 2010, entitled "SYSTEM AND METHOD OF DETECTING AND ASSESSING MULTIPLE TYPES OF RISKS RELATED TO MORTGAGE LENDING," which is hereby incorporated by reference herein in its entirety. This application is related to U.S. patent application Ser. No. 12/538,721, now issued as U.S. Pat. No. 8,121,920, which is a continuation of U.S. patent application Ser. No. 11/526,208, now issued as U.S. Pat. No. 7,587,348, which claims the benefit of U.S. Provisional Patent Application No. 60/785,902, filed Mar. 24, 2006 and U.S. Provisional Patent Application No. 60/831,788, filed on Jul. 18, 2006. Portions of the '721 application are reproduced herein. The disclosure of publications and patent applications mentioned in this specification are herein incorporated by reference to the same extent as if each individual publication or patent application was specifically and individually indicated to be incorporated by reference.

BACKGROUND OF THE DISCLOSURE

1. Field of the Invention

The present disclosure relates to computer processes for detecting and assessing multiple types of risks in financial transactions.

2. Description of the Related Technology

Many financial transactions are fraught with risks. For example, a mortgage lender may face risks of borrower default and fraud. A fraud detection system may be configured to analyze loan application data to identify applications that are being submitted with fraudulent application data. A separate default risk detection system may be configured to analyze the same application data to address the risk of borrower default.

However, existing risk detection systems have failed to keep pace with the dynamic nature of financial transactions. Moreover, such systems have failed to take advantage of the increased capabilities of computer systems. Thus, a need exists for improved systems and methods of detecting and assessing various types of risks associated with financial transactions.

SUMMARY OF THE DISCLOSURE

The system, method, and devices disclosed herein each have several aspects, no single one of which is solely responsible for its desirable attributes. Without limiting the scope of the various embodiments as expressed by the claims which follow, the more prominent features of the various embodiments will now be discussed briefly. After considering this discussion, and particularly after reading the section entitled "Detailed Description of Certain Embodiments," one will understand how the features of the various embodiments provide advantages that include improved detection and assessment of risks in financial transactions such as mortgage transactions.

Embodiments disclosed herein provide systems and methods for detecting and assessing various types of risks associated with financial transactions, such as transactions involved in mortgage lending. Embodiments of the risk detection and assessment system combine two or more individual data models that are configured to detect and assess particular types of risks into a single combined model that is better suited for detecting risks in the overall transactions. Various embodiments disclosed herein combine discrete data models, each of which may be utilized on its own to provide a specific risk score. In one embodiment, the data models include at least a model for detecting and assessing mortgage fraud risk, a model for detecting and assessing early mortgage payment default risk, and a multi-component risk model for detecting and assessing risks, with the model based primarily on analysis of data external to a mortgage loan (e.g., analysis of property values in the local market). Other embodiments of the detection and assessment system may include additional models, e.g., a model for detecting the presence of fraudulently reported income data.

Although the individual models may be capable of predicting individual risks, they may only offer a partial picture of the overall risks. From a risk management standpoint, a user of such predictive models would typically stand to suffer financial losses in mortgage transactions if any of such risks materialize. While it is theoretically possible to apply many or all of these individual models for every loan application, generate scores from all the models and review them, in practice this becomes burdensome on the human reviewers. Indeed, by definition a score is an abstraction of the risks, and the very nature of a risk score is to enable quick detection and assessment of risks without a human review of all the underlying data.

Therefore, in one embodiment, the combined model takes as input selected scores output by the individual models and potentially other data, processes the selected scores and other data, and generates a single combined score that may reflect an overall risk of a particular transaction. The combined model presents these risks in a comprehensive fashion and is configured to detect potentially hidden risks that may otherwise be difficult to detect by an individual model. Additional performance gains of the combined model over the individual models may include a reduction of false positives, an increase in the dollar amount of identified fraudulent and/or high-risk loans, and an increase in the instances of identified fraudulent and/or high-risk loans.

In one embodiment, such a combined model may be created based on evaluating the performance of the underlying models (or sets of models) in detecting risks, including fraud and default risks. One or more combined models may be generated by using data including a set of historical transactions in which fraud and/or default outcomes are known. Other combined models may be based on data including, test/training data, current data, real-time data, a mix of historical data, current data, and/or real-time data. Additionally or alternatively, the correlation between the underlying models may be measured, and selected features from the models may be used to create a combined model that is trained on data such as test/training data. The features selected may be based on the type of data analysis modeling structure(s) and technique(s) chosen for the combined model. The performance of the resulting combined model may be evaluated against the performance of the individual models, and adjustments to the combined model may be made to further improve performance.

The combined models as described herein are especially suitable for mortgage fraud and default detection because many parties are involved in the whole mortgage origination and funding process and mortgage risk exists almost everywhere, from borrowers, to collaterals, to brokers. By combining results from different models having focus in different domains (such as borrower risk, collateral risk, broker risk, identity risk, loan risk, etc.), the combined model(s) provide a more comprehensive and accurate risk assessment of each loan application than any single model alone can provide.

As disclosed herein, the term "mortgage" may include residential, commercial, or industrial mortgages. In addition, "mortgage" may include first, second, home equity, or any other loan associated with a real property. In addition, it is to be recognized that other embodiments may also include risk detection and assessment in other types of loans or financial transactions such as credit card lending and auto loan lending.

BRIEF DESCRIPTION OF THE DRAWINGS

FIG. 4 is sample report showing a risk score and associated risk indicators generated by the combined model in accordance with an embodiment.

DETAILED DESCRIPTION OF CERTAIN EMBODIMENTS

The following detailed description is directed to certain specific embodiments of the invention. However, the invention can be embodied in a multitude of different ways as defined and covered by the claims. In this description, reference is made to the drawings wherein like components are designated with like numerals throughout.

Risk Detection and Assessment System Overview

Figure 1A:
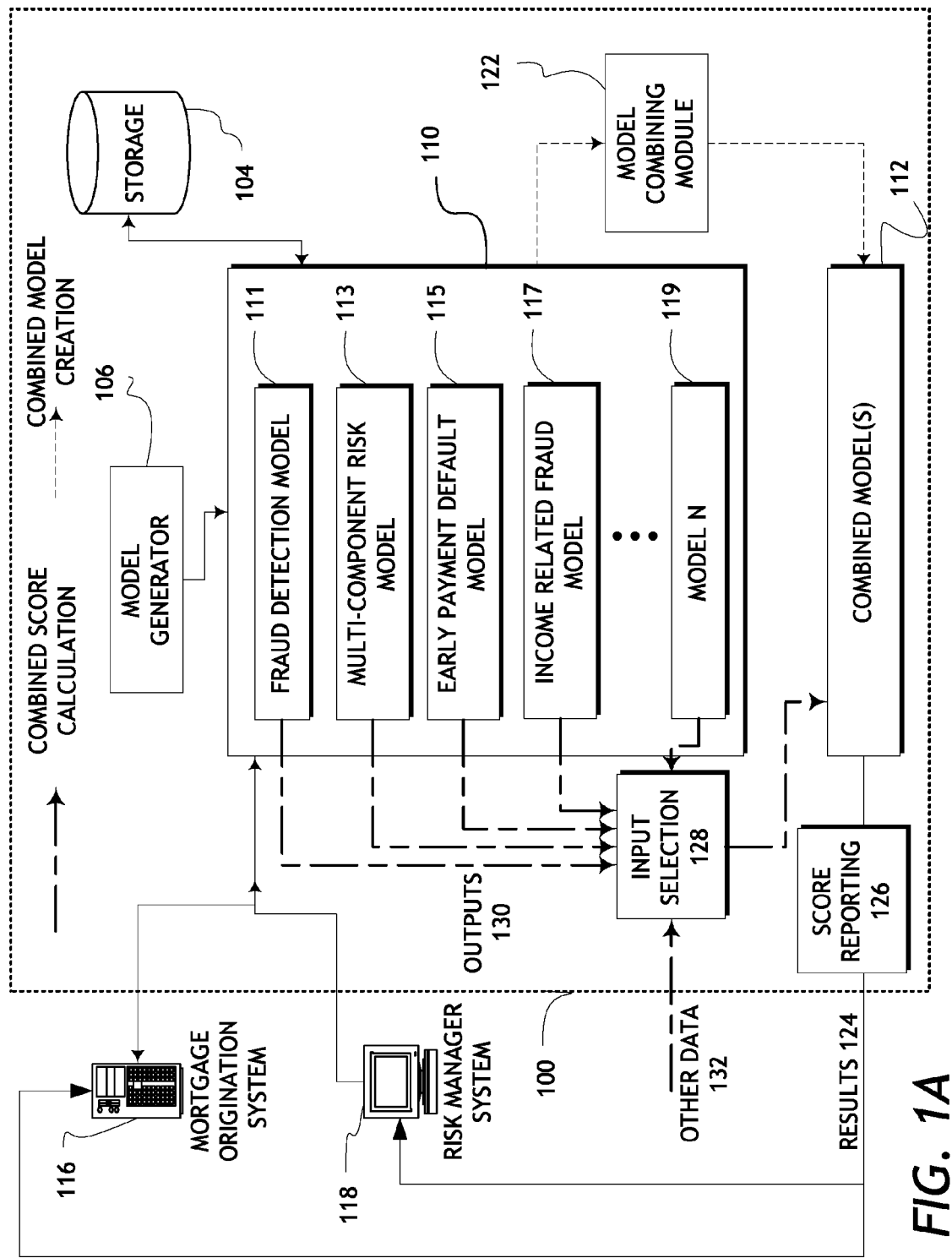
FIG. 1A is a functional block diagram illustrating a risk detection and assessment system in accordance with an embodiment.

FIG. 1A is a functional block diagram illustrating a risk detection and assessment system 100. In one embodiment, the risk detection and assessment system is used with a mortgage origination system 116. In other embodiments, the risk detection and assessment system 100 may be used in evaluating mortgage applications and/or funded loans by an investment bank or as part of due diligence of a loan portfolio. The risk detection and assessment system 100 may receive and store data in a storage 104. The storage 104 may comprise one or more database servers or devices, and may use any suitable configuration of volatile and/or persistent memory. The risk detection and assessment system 100 may be configured to receive mortgage application data from the mortgage origination system 116 and provide results 124 of its risk detection and assessment, via a score reporting module 126, back to the mortgage origination system 116. In one embodiment, the risk detection and assessment system 100 uses multiple models to generate the results of its detection and assessment of data indicative of various types of risks, including, for example, fraud risks and default risks. The results 124 may also be provided, via the score reporting module 126, to a risk manager system 118 for further processing and/or analysis by a human operator. The risk manager system 118 may be provided in conjunction with the risk detection and assessment system 100 or in conjunction with the mortgage origination system 116.

A model generator 106 may provide models 110 to the risk detection and assessment system 100. In one embodiment, the model generator 106 provides the models periodically to the system 100, such as when new versions of the system 100 are released to a production environment. In other embodiments, at least a portion of the model generator 106 is included in the system 100 and configured to automatically update at least a portion of the models in the system 100. Each model may, for example, be in the form a code module executed by computer hardware, and may embody a particular risk assessment algorithm. The models 110 may include one or more discrete models that are configured to assess certain types of risks and may generate risk scores and/or risk indicators. Models such as models 111, 113, 115, and 117 are described in further detail below, and these models may be combined together by a model combining module 122 to create a combined model 112. The creation of the combined model is shown by the dotted arrow lines to the right of the models 110, and the combined model creation process will be further described below in conjunction with FIGS. 2, 3A, and 3B. Each individual model may operate or be used independently to generate a score or indicator of risk. For example, the fraud detection model 111 may be used to generate an independent score that predicts presence of fraudulent application data in a mortgage application. In one embodiment, the model combining module 122 combines two or more of these models (including any other suitable model(s) 119, if any) to generate scores or risk indicators. In one embodiment, the combined model 112 may be encoded in software, such as analytical software available from the SAS Institute, Inc.

In one embodiment, once the combined model 112 is generated, when a particular loan application to be assessed is submitted to the combined model 112 in operation, the combined model 112 takes as input outputs 130 (e.g. risk scores) generated by the individual models 110 and/or other data 132. Other data 132 may include loan balance data. As shown, the combined score calculation process is indicated by the dashed arrow lines to the left of the models 110, and the process will be further described below in conjunction with FIGS. 2 and 3C. The individual models 110 may take as input loan data from the mortgage origination system 116 and/or the storage 104, credit data, property data, and other data from the system 116, the storage 104 and/or other sources, in order to derive the individual score outputs 130. In one embodiment, an input selection module 128 selects a portion of the outputs 130 and the other data 132 for input into the combined model 112. The combined model offers enhanced risk detection and assessment capabilities because it is able to evaluate the interaction of various types of risks, each of which would normally be detected by a particular type of risk detection model. For example, the combined model may be better suited to detect data indicative of risks that may be undetectable by the individual models. In addition, false positives may be reduced in the combined model as it is built upon recognizing the problematic areas of the individual models and the various models are able to complement one another.

Finally, the results 124 including the calculated combined score, and optionally the associated risk indicators, are provided through a score reporting module 126 to the mortgage origination system 116, the risk manager system 118, and/or other systems.

Brief Overview of the Individual Models

Embodiments of the models 110 include a fraud detection model 111 that detects the risk of the presence of fraudulent data in a mortgage application. The model 111 may be created by a variety of data, including but not limited to: data indicative of historical transactions and, optionally, data related to historical transactions of entities (e.g. brokers, appraisers, etc.) other than the subject loan application. One suitable embodiment of the model 111 is described in U.S. Pat. No. 7,587,348 entitled "SYSTEM AND METHOD OF DETECTING MORTGAGE RELATED FRAUD," which is owned by the assignee of the present application and the disclosure of which is hereby incorporated by reference. Portions of the '348 patent are also reproduced herein. Further details of one embodiment of the model(s) 111 are described below in the section entitled "Fraud Detection Model." In one embodiment, the model 111 generates a score for each mortgage loan application to provide lenders with accurate detection of suspicious loan fraud activity.

One embodiment of the models 110 includes a multi-component risk model 113 that generates one or more risk scores and/or indicators relating to various types of risks associated with mortgage lending. One embodiment of the multi-component risk model 113 is based on or otherwise combines one or more of the following risk scores: (1) a property risk score, (2) a broker risk score, (3) a borrower risk score, (4) a market risk score, and (5) an overall risk score based on several or all of the above risk scores. In one embodiment, the multi-component risk model 113 analyzes data external to a subject loan or mortgage transaction to determine a risk of the transaction. For example, the multi-component risk model 113 may evaluate recent property sales in the local real estate market to derive a property risk score that indicates a risk of early payment default (90+ days delinquent in the first year) and substantial loss in value in the subject property. Embodiments of the model 113 are described in further detail below in the section entitled "Multi-Component Risk Model."

Other models 110 may include a model 115 that generates data indicative of early payment default (EPD). This EPD model 115 may provide a risk score indicative of an early payment default risk by the borrower (e.g., default in the first few months of the loan term). One suitable embodiment of such a system and model 115 is disclosed in U.S. Patent Publication No. 2009/0099959, filed on Oct. 6, 2008 and entitled "METHODS AND SYSTEMS OF PREDICTING MORTGAGE PAYMENT RISK," which is owned by the assignee of the present application and the disclosure of which is hereby incorporated by reference in its entirety. Portions of the '959 published application are reproduced herein. In one such embodiment, the EPD model 115 includes a method of detecting a risk of payment defaults; the method includes (1) receiving mortgage data associated with a mortgage application, (2) determining a first score for the mortgage data based on one or more models that are in turn based on data from historical mortgage transactions and historical credit information related to the applicant, and (3) generating data indicative of a risk of payment default based on the first score. The credit information may include information related to payment history, credit scores, employment, tenure, income, and/or debt. The mortgage application data may include property valuation information and geographic information. For example, the model or models 115 may be configured to output scores and/or other risk indicators based in part on geographic default risk information. Embodiments of the models 115 are described in further detail below in the section entitled "Early Payment Default Model."

Models 110 may additionally include a model 117 that generates an indicator on whether income data or stated income data is likely to be accurate. Suitable embodiments of such model 117 are disclosed in U.S. patent application Ser. No. 11/864,606, filed on Sep. 28, 2007, which is owned by the assignee of the present application and the disclosure of which is hereby incorporated by reference. Portions of the '606 application are reproduced herein. Embodiments of the model 117 are further described below in the section entitled "Income Related Fraud Detection Model."

Providing an Overall Risk Picture

Figure 1B:
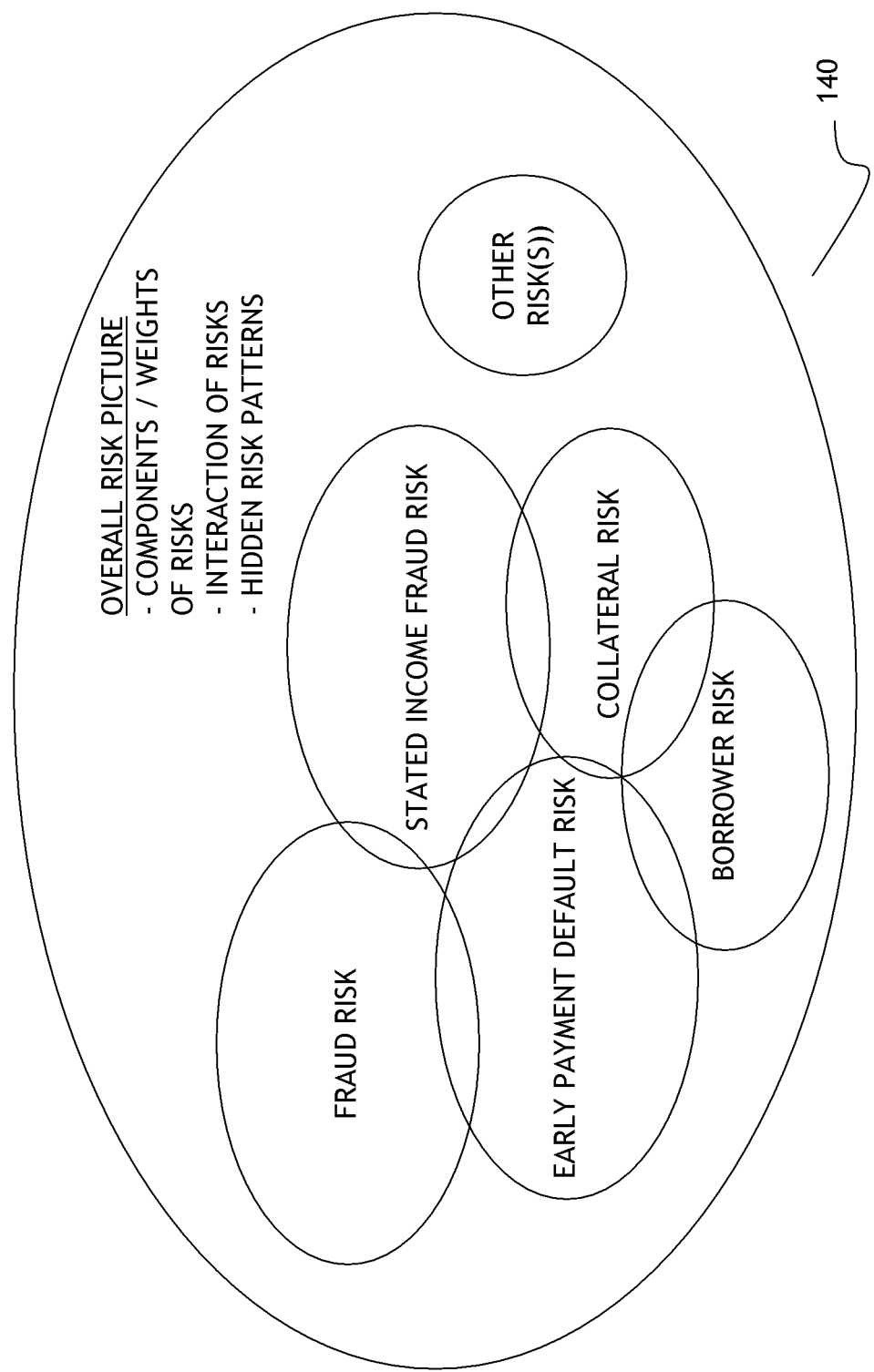
FIG. 1B is a schematic diagram illustrating an aspect of the combined scoring model that provides an overall risk picture of a mortgage lending transaction.

FIG. 1B illustrates an aspect of the result generated by the combined model 112 that is reflective of the overall risk picture of a mortgage application. In a typical mortgage lending scenario, a number of risks are present, as shown for example in FIG. 1B. Individual data models may be geared toward detecting and assessing these individual risks. However, as shown in FIG. 1B, these risks often overlap and may be interrelated. For example, a fraud in the stated income may be a part of a larger fraudulent scheme, and may be relevant to early default payment risk.

By combining individual data models through the systems and methods described herein, the risk detection and assessment system 100 is able to provide a combined risk score and associated risk indicators that reflect an overall risk assessment that takes into account the risk components in the overall risk picture as well as the individual weights of these risk components. The system 100 may also be able to examine the interaction of risks and detect hidden risk patterns that otherwise may not be easily detectable by individual models that focus on certain types of risks. In addition, by using a combined model approach, the risk detection and assessment system 100 may reduce the number of false positives in its results.

The combined score is likely to be more predictive of the loss event (e.g., fraud, default) than each individual risk score. A loan officer may thus elect to review all loan applications receiving a certain threshold combined score (e.g., a combined score of 750 of higher on a scale of 1-999, with the higher score indicating a higher risk). The higher predictive rate will assist the officer in the task selecting the proper applications for further review while reducing efforts expended on the review of false positive applications.

Risk Detection and Assessment Process

Figure 2:
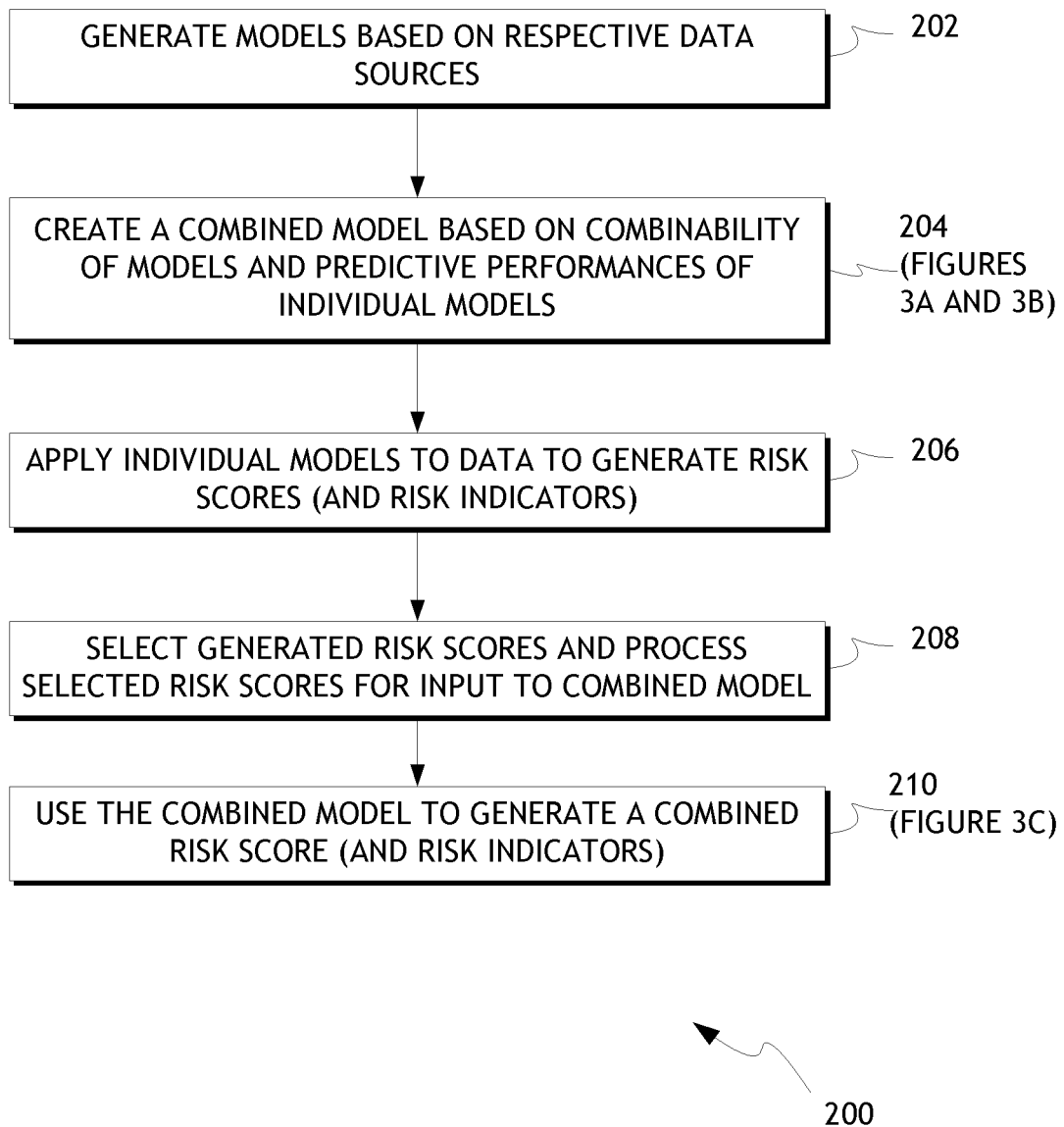
FIG. 2 is a flowchart illustrating the operation of the risk detection and assessment system in accordance with an embodiment.

FIG. 2 is a flowchart illustrating a method of operation 200 of the risk detection and assessment system 100. In one embodiment, the method 200 begins at a block 202 in which the model generator 106 generates models (e.g., a fraud detection model) based on respective data sources. The models can also be generated by human programmers. In another embodiment, the model generator 106 receives previously generated models from an external entity. Models may be generated in a supervised or unsupervised manner. For example, parts of the fraud detection model 111 may be generated based on supervised training or data analysis that is based on data including historical transactions that have been identified as fraudulent or non-fraudulent. Further details on generating supervised models are discussed with reference to FIG. 6A. Moreover, portions of the model 111 may also include unsupervised entity models such as the account executive model 542, the broker model 544, the loan officer model 546, or the appraiser (or appraisal) model 548. Further details on generating unsupervised models are discussed below with reference to FIG. 6B.

Next at a block 204, the risk detection and assessment system 100 creates one or more combined models 112 based on the individual models 110. In one embodiment, the creation of the combined model 112 includes evaluating the combinability of the models 110 and their individual predictive performances. For example, the individual models may be applied to historical transactions with known fraudulent and non-fraudulent transactions. The results of such applications may be compared to determine whether combining certain models results in better overall predictive performance. In one embodiment, different combinations are tested against data with known outcomes to determine which combinations are suitable. As further described herein, the creation of the combined model 112 may involve additional processing such as feature extraction, correlation of the results of the models 110 and/or of the results and data fields, and execution of supervised learning and/or unsupervised learning methods. Further details on creating the combined model are provided with reference to FIGS. 3A-3B.

Proceeding to a block 206, the system 100 in one embodiment applies the individual models 110 to data (including loan data and other non-loan data such as public records, credit data, etc.) to generate risk scores. In a block 208, generated scores from the individual models are selected based on the combined model 112 that is created and/or in use. In one embodiment, more than one combined models may be created and placed in use, and each combined model may select different generated scores from the individual models. In the block 208, the selected scores may also be processed, i.e., combined and/or mathematically manipulated into input features that will serve as input to the combined model in use. An example input feature may be the maximum of two or more model scores, e.g., max(model score 1, model score 2, . . . , model score n). Another example input feature may be the average of several model scores. In other embodiments, the input features may include other non-score data such as a loan amount and a combination of scores and non-score data. In one embodiment, the risk indicators from the block 206 are provided to the combined model 112 as well.

Proceeding to a block 210, the system 100 in one embodiment uses the combined model 112 to generate a combined risk score. Risk indicators may be provided by the combined model 112 as well, based on the risk indicators generated in the block 206 by the individual models. The risk indicators enable the system 100 to output explanatory, i.e., textual information along with the combined risk score so a user can better understand the risk factors that contributed to the combined risk score and take appropriate remedial actions. For example, the EPD model 115 may provide to the combined model 112 a risk indicator indicating a high EPD risk due to the borrower's credit history. In the final combined risk score output, if the EPD model score is deemed to have contributed to the combined risk score in a significant way, the same risk indicator may be provided to the user so the user can investigate the borrower's credit history. An example listing of risk indicators with a combined score will be further described below in conjunction with FIG. 4. In one embodiment, the functions of blocks 206, 208, and 210 may be repeated for each loan application that is to be processed.

In one embodiment, the model generator 106 generates and/or updates models 110 and their component models as new data is received or at specified intervals such as nightly or weekly. In other embodiments, some models 110 are updated continuously and others at specified intervals depending on factors such as system capacity, mortgage originator requirements or preferences, etc. In one embodiment, some models are updated periodically, e.g., nightly or weekly while other models are only updated when new versions of the system 100 are released into operation.

Model Combination Process

Figure 3A:
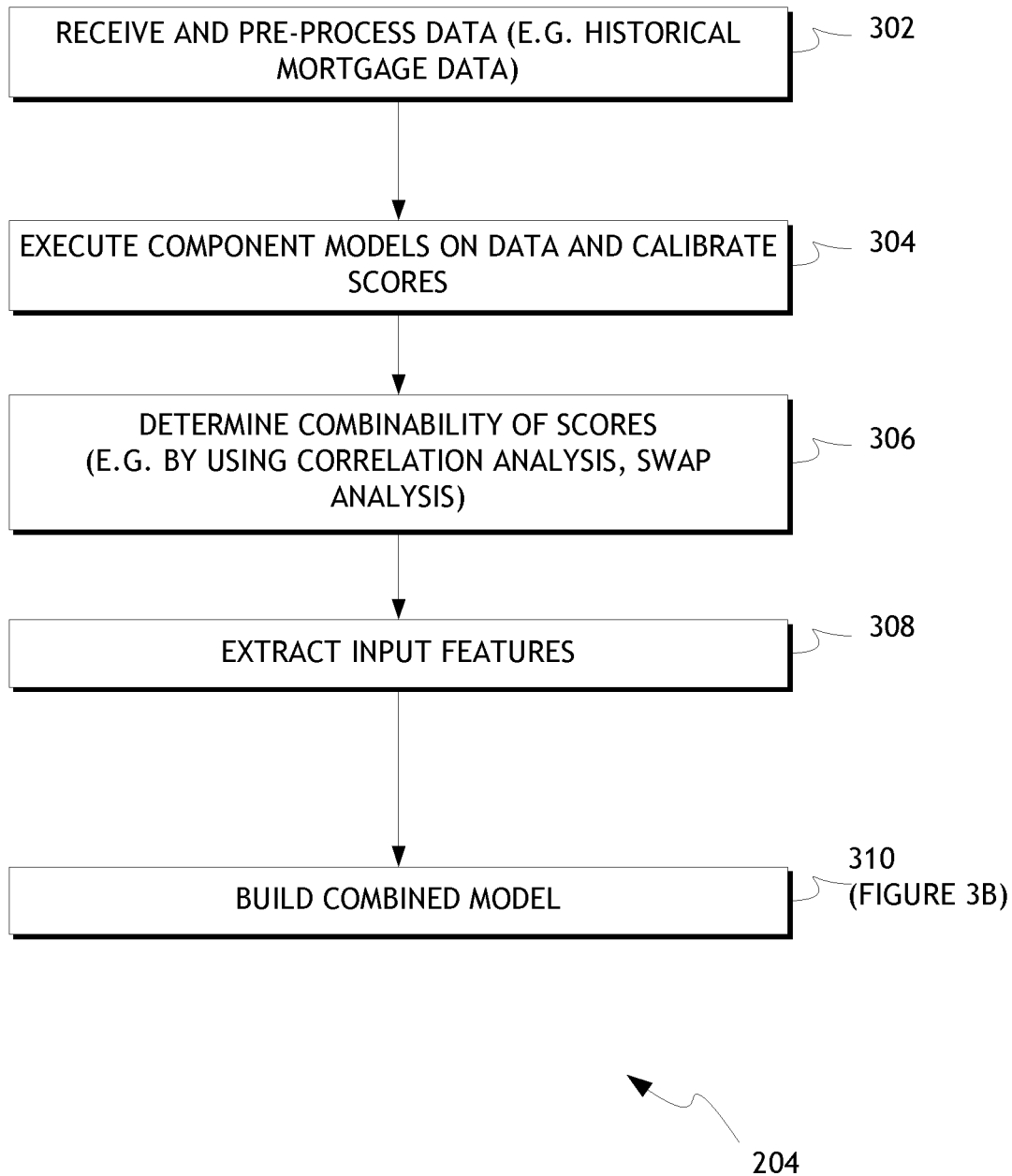
FIG. 3A is a flowchart illustrating a method of creating a combined model for detecting and assessing risks in financial transactions in accordance with an embodiment.

FIG. 3A is a flowchart illustrating in further detail block 204 of FIG. 2. The method of creating a combined model in block 204 begins at a block 302 in which the model combining module 122 receives data (e.g., historical mortgage/loan data) for the purpose of evaluating and/or training one or more of the models 110. Receiving the data may include data preprocessing. For example, the received data may be collected in a comprehensive way to cover the required fields for some or all of the models 110. Such data may be extracted, mapped, and preprocessed to the multiple datasets as input data for each model 110. For example, in one embodiment, different models 110 may have different definitions and format requirements for one field such that one field may represent the same content but in a different format from input datasets to different models 110.

Certain additional preprocessing may be performed on the data set to ensure good and reliable data for proper model training. This may include estimating missing values, converting categorical levels into numerical values, removing outliers (extreme values), and/or standardizing/normalizing the feature values.

The received data (e.g., historical loan performance data), including payment history, default, fraud, foreclosure, and repurchase, etc., may be linked to the loan application data such that the loan data are tagged with an outcome label or indicator. In one embodiment, the good or non-fraudulent population is tagged with one label and the bad or fraudulent population is tagged with another. The purpose of this tagging is to provide a systematic training method to group the training loans due to their internal risk characteristics and implement the same judgment on the new loans without knowing their labels a priori.

Next at a block 304, in one embodiment, the model combining module 122 executes the component models 110 on the tagged transaction data and calibrates any resulting scores. In particular, in one embodiment, the tagged data is applied to each of the models 110 and the resulting scores and other outputs are processed to generate the combined model 112. In one embodiment, each model 110 runs the derived dataset received at the block 302 from the preprocessed data and generates a respective model score. In one embodiment, each score represents a specific risk associated with the respective model 110. The scores from the models may be calibrated to the same dynamic range (e.g., 1-999, ranging from low risk to high).

Model Combination Process: Correlation Analysis

In one embodiment, after the scores are calibrated, in block 306, the model combining module 122 determines the combinability of the models based on the scores. In one embodiment, the results of the models 110 are subject to a correlation analysis. The correlation of the respective scores indicates how similar the model scores are. If the correlation of two model scores is high, the two model scores are very much alike and the small discrepancy between the two scores may not make a difference in the output of the combined model 112. In an extreme case where the correlation of two model scores is equal to 1, there is no need to combine the two scores together since they are identical. If one of the scores is highly correlated with another score and further analysis demonstrates high overlap in detection, the weighting of the two similar scores in the combined model 112 may be reduced. In one embodiment, correlation analysis is based second order statistics. However, if any non-Gaussian noise is expected to be involved, in other embodiments, the second order statistics may be expanded to higher order statistics by using mutual information or entropy as a more sophisticated measurement.

Model Combination Process: Swap Analysis

In addition to or in place of correlation analysis, at block 306 the model combining module 122 may perform swap analysis on the results and inputs of the models 110 based on application of the received data (e.g., tagged data). Swap analysis may be performed in the input space without reference to the score prediction performance. A swap analysis shows the overlap and discrepancy of the review population based on the different outsorting logic of the respective scores of the models 110. The proportion of overlap in the reviewed population conforms to the correlation analysis, where a high portion of overlap means high correlation between the scores. The swap analysis further measures the similarity between the models in terms of the prediction performance, based on the associated tags for the particular transaction (e.g., fraud, early payment default, default, fraud plus early payment default, fraud plus default, etc.). The set of models 110 that has a small volume of overlapping detected bad loans under the same review rate demonstrate that the models are capable of detecting different types of bad loans. Therefore, the combined scores of such models 110 are likely to score more accurately than the individual models.

Model Combination Process: Feature Extraction

Moving to a block 308, the model combining module 122 may extract features for creating the combined model 112. Feature extraction is the process of designing predictive input features to build models such as the model 112. This process may include application of a significant amount of domain knowledge in granular details of mortgage fraud and mortgage risk and be performed at least in part by a human analysis. Such domain knowledge is combined with the data-driven analysis to select the features due to their predictiveness and robustness from both technical and business points of view.

The complexity of the feature extraction is directly related to the modeling method. To achieve a same level of predictive power for a complex classification problem, a simpler linear model typically requires a more complex feature encoding. On the other hand, a more complex nonlinear model may have less demand on the features. In either case, robust features will always assist in obtaining better performance. Different modeling methods will typically select different sets of features. The feature extraction for the combined model 112 may comprise identifying (1) the interaction among the individual model scores from the respective models 110, (2) the interaction between an individual model score and other input fields outside the scope of the respective model (such as loan amount or borrower's years on a particular job, in the case of mortgage fraud or default prediction), and (3) derivatives of such data. Once features are extracted, one or more feature selection algorithms may be performed to select the best subset of features that are most predictive and relevant. Feature selection methods can be classified as Wrapper, Filter, and Embedded, which are methods for selecting features for the purposes of building predictive models. In one embodiment, suitable feature selection methods include forward/backward stepwise selection, sensitivity analysis, correlation analysis, and class separability measure. The list below illustrates a number of example data points from which input features may be selected:

fraud detection model score
    multi-component risk model overall score
        collateral component risk score
        broker component risk score
        borrower component risk score
        market component risk score
    early payment default risk model score
    loan balance As shown in block 128 of FIG. 1A, the individual model scores and other data points are selected and processed (i.e. mathematically manipulated and/or combined) to create input features for the combined model at run time. For example, as discussed above, the individual model scores may need to be normalized on the same scale. In one embodiment, the selection and processing performed at run time are based on the outcome of the feature extraction step performed during the combined model creation process. As an example, if the feature extraction process (performed by the model combining module 122 in one embodiment) at time of model creation selects features A and B, the input selection module 128 at run time will create features A and B based on the individual model scores and data points for input to the combined model. Example input features may include, or based on a combination of, the results of some of the following operations on the data points (such as those referenced above):

the maximum of several scores and/or non-score data points
    the minimum of several scores and/or non-score data points
    the average of several scores and/or non-score data points
    the dynamic range of the several scores and/or non-score data points (max−min)
    the ratio of the dynamic range over the average
    the loan balance Thus, as a further example, after the combined model is created and placed into operation, the "several scores" referenced above may be determined to be individual model score "A," score "B," and score "C." Hence, at run time, when a particular application is under evaluation, the input selection block 128 may choose score "A," score "B," and score "C" from all the score outputs 130 from the individual models 110 as applied to the subject loan application data and related data. The input selection block 128 may then perform the mathematical operations (e.g., max(Score A, Score B, Score C)) that are necessary to create the input features to be supplied into the combined model 112 to generate the final combined score. In some embodiments, a chosen score for creating an input feature may be a component score or a sub-score of one of the models 110 (e.g., the borrower component risk score of the multi-component model 113).

Model Combination Process: Model Building

Moving to a block 310, in one embodiment the model combining module 122 executes a machine learning or data mining algorithm to generate a combined model that distinguishes the fraudulent from the non-fraudulent transactions based at least in part on output of other models 110. In particular, after a pool of potential features has been created, a certain model structure and modeling techniques may be determined according to the data itself.

Figure 3B:
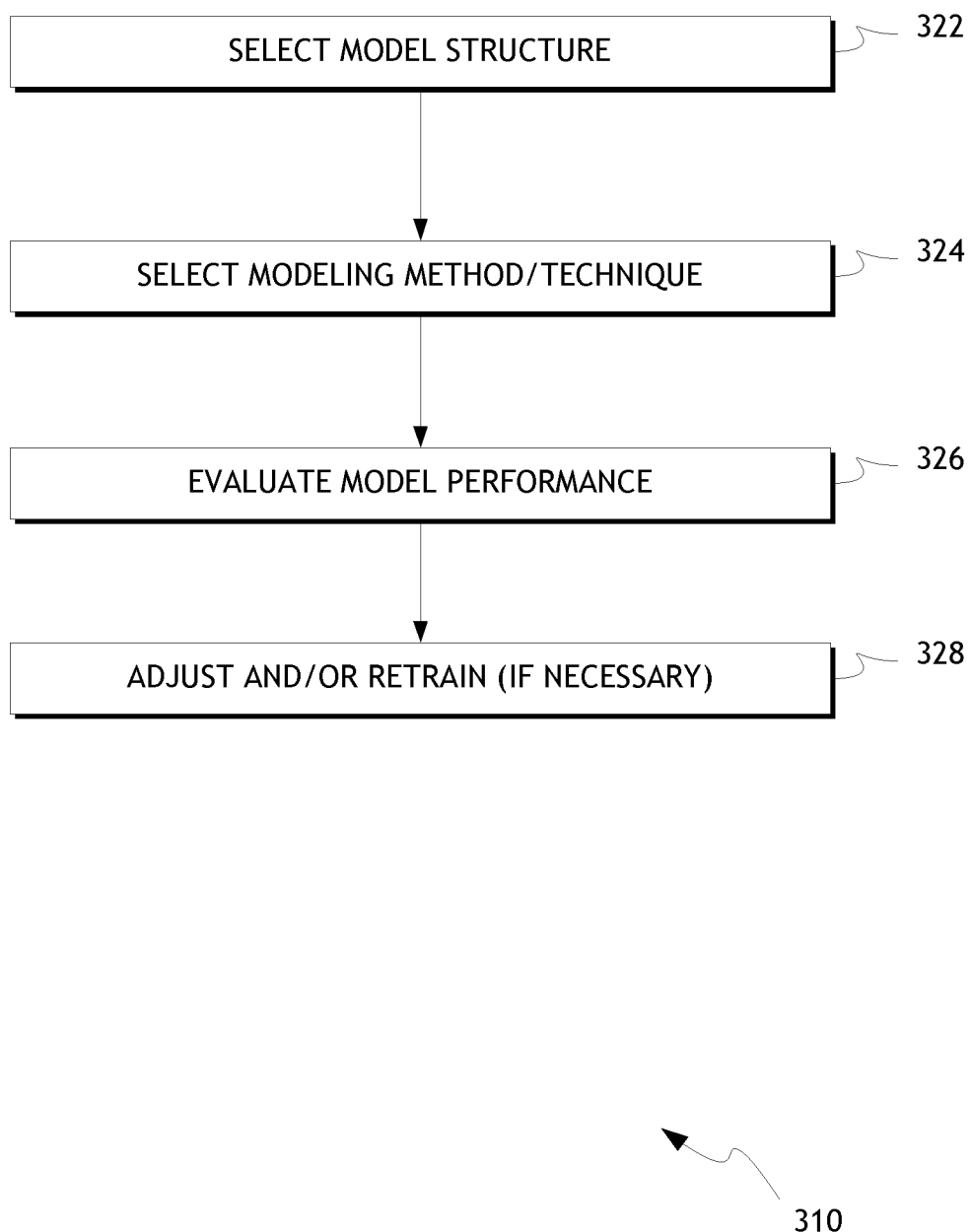
FIG. 3B is a flowchart illustrating a method of building a combined model for detecting and assessing risks in financial transactions in accordance with an embodiment.

As further illustrated in FIG. 3B, generating the combined model 112 includes selecting modeling structure(s) (block 322) and modeling method(s)/technique(s) (block 324). In one embodiment, human analysts generate initial model structures and select the modeling methods used in the combined model 112. The combined model 112 may be subsequently updated based on new or updated data (e.g., tagged historical data) to adapt the model 112 to evolving fraud and/or risk tends.

The combined model 112 may comprise any suitable structure of individual models 110. For example, the combined model 112 may comprise model structures including one or more of a cascaded structure, a divide-and-conquer structure, and a mixed structure.

In a cascaded structure, scores of individual models 110 are ranked in a specified order, e.g., model 1 ... N. The first model score is initially joined with input fields to generate an intermediate stage 1 score; the second model score is again joined with the stage 1 score together with input fields to generate an intermediate stage 2 score; and so on. The last model score is joined with the stage N−1 score (or all the previous scores) together with input fields to generate the output of the overall model 112. In each cascaded stage, the tag information can be either the same for all the cascades or have different types of risk in cascades (if the target for each stage is the residue between the tag and the previous score starting from the second stage, it implements a boosting methodology).

In a divide-and-conquer structure, each individual model 110 acts as an independent module and a combination gate incorporates all the model scores with the other interactive input fields to produce the final output score.

In a mixed structure, any module of cascaded or divide-and-conquer structures may be replaced by another network of further individual models. For example, in the cascaded structure, the last stage of the cascaded structure can be a divide-and-conquer structure. As a further example, in the divide-and-conquer structure, one or more of the modules can be replaced by a cascaded structure.

Once the structure of the model 112 is selected at block 322, in one embodiment a suitable modeling technique/method is applied to generate each individual model at block 324. Such modeling techniques may include but are not limited to linear regression, logistic regression, neural networks, support vector machines, decision trees, and their derivatives. Suitable modeling methods may include machine learning/data mining techniques including linear regression, logistic regression, neural networks, support vector machine, decision tree, etc. In practice, one technique can be used in the research effort to provide insights for another modeling technique. Thus a combination of techniques can be used in the analysis and in the product implementation.

As discussed above, suitable modeling methods include linear regression and/or logical regression. Linear regression is a widely used statistical method that can be used to predict a target variable using a linear combination of multiple input variables. Logistic regression is a generalized linear model applied to classification problems. It predicts log odds of a target event occurring using a linear combination of multiple input variables. These linear methods have the advantage of robustness and low computational complexity. These methods are also widely used to classify non-linear problems by encoding the nonlinearity into the input features. Although the mapping from the feature space to the output space is linear, the overall mapping from input variables through features to output is nonlinear and thus such techniques are able to classify the complex nonlinear boundaries. Desirably, the linear mapping between the feature space and the output space may make the final score easy to interpret for the end users.

Another suitable modeling method is neural networks. Logistic regression generally needs careful coding of feature values especially when complex nonlinear problems are involved. Such encoding needs good domain knowledge and in many cases involves trial-and-error efforts that could be time-consuming. A neural network has such nonlinearity classification/regression embedded in the network itself and can theoretically achieve universal approximation, meaning that it can classify any degree of complex problems if there is no limit on the size of the network. However, neural networks are more vulnerable to noise and it may be more difficult for the end users to interpret the results. In one embodiment, one suitable neural network structure is the feed-forward, back-prop, 1 hidden layer version. Neural networks may provide more robust models to be used in production environments when based on a larger data set than would be need to provide robust models from logistic regression. Also, the number of hidden nodes in the single hidden layer is important: too many nodes and the network will memorize the details of the specific training set and not be able to generalize to new data; too few nodes and the network will not be able to learn the training patterns very well and may not be able to perform adequately. Neural networks are often considered to be "black boxes" because of their intrinsic non-linearity. Hence, in embodiments where neural networks are used, when higher risk scores are returned accompanying reasons are also provided. One such option is to provide risk indicators in conjunction with scores generated by neural network based models, so that the end user can more fully understand the decisions behind the high risk scores.

Embodiments may also include models 112 or components of the models 112 that are based on support vector machines (SVMs). A SVM is a maximum margin classifier that involves solving a quadratic programming problem in the dual space. Since the margin is maximized, it will usually lead to low generalization error. One of the desirable features of SVMs is that such a model can cure the "curse of dimensionality" by implicit mapping of the input vectors into high-dimensional vectors through the use of kernel functions in the input space. A SVM can be a linear classifier to solve the nonlinear problem. Since all the nonlinear boundaries in the input space can be linear boundaries in the high-dimensional functional space, a linear classification in the functional space provides the nonlinear classification in the input space. It is to be recognized that such models may require very large volume of independent data when the input dimension is high.

Embodiments may also include models 112 or components of the models 112 that are based on decision trees. Decision trees are generated using a machine learning algorithm that uses a tree-like graph to predict an outcome. Learning is accomplished by partitioning the source set into subsets using an attribute value in a recursive manner. This recursive partitioning is finished when pre-selected stopping criteria are met. A decision tree is initially designed to solve classification problems using categorical variables. It can also be extended to solve regression problem as well using regression trees. The Classification and Regression Tree (CART) methodology is one suitable approach to decision tree modeling. Depending on the tree structure, the compromise between granular classification, (which may have extremely good detection performance) and generalization, presents a challenge for the decision tree Like logistic regression, results from decisions trees are easy to interpret for the end users.

Once the modeling structure and the modeling method are determined, the model 112 is trained based on the historical data adaptively. The parameters of the model "learn" or automatically adjust to the behavioral patterns in the historical data and then generalize these patterns for detection purposes. When a new loan is scored, the model 112 will generate a combined score to evaluate its risk based on what it has learned in its training history. The modeling structure and modeling techniques for generating the model 112 may be adjusted in the training process recursively.

The listing of modeling structures and techniques provided herein are not exhaustive. Those skilled in art will appreciate that other predictive modeling structures and techniques may be used in various embodiments. Example predictive modeling structures and techniques may include Genetic Algorithms, Hidden Markov Models, Self Organizing Maps, Dynamic Bayesian Networks, Fuzzy Logic, and Time Series Analysis. In addition, in one embodiment, a combination of the aforementioned modeling techniques and other suitable modeling techniques may be used to in the combined model 112.

Combined Model Performance Evaluation

The performance of the combined model 112 may be evaluated in its predictive power and generalization prior to release to production. For example, in one embodiment, at a block 326, the performance of a combined model 112 is evaluated on both the training dataset and the testing dataset, where the testing dataset is not used during the model development. The difference between the performance in the training data and the testing data demonstrates how robust the model is and how much the model is able to generalize to other datasets. The closer the two performances are, the more robust the model is.

A number of suitable metrics may be used to evaluate the predictive ability of the combined model 112. One embodiment uses a commonly used metric called the Receiver Operating Characteristic (ROC) curve. ROC demonstrates how many bad loans are detected by the model under a certain review volume by showing the adaptive boundary change using different score thresholds. This metric is independent of the intrinsic fraud (or bad) rate in the data and thus is a good metric to compare across differing data sets. In one embodiment, the derivative of ROC is also used to demonstrate how much total value in the bad loans is detected by the model under a certain review volume. In one embodiment, the ROC charts are plotted for the combined model 112 and all the individual model scores alone, so that improvement in performance can be easily seen at all review rates. In one embodiment, performance improvement is measured using one or more of the following metrics: false positive rate, fraud amount detection rate (the total dollar amount of fraudulent loans detected), and count detection rate (the total instances of fraudulent loans detected).

Finally, at a block 328, the generated combined model 112 may be adjusted and/or retrained as needed. For example, the combined model may be adjusted to use a different modeling technique, based on the evaluation of the model performance. The adjusted combined model 112 may then be re-trained. In another example, the combined model may be re-trained using updated and/or expanded data (e.g., historical transaction data) as they become available.

Scoring Process Using the Combined Model

Figure 3C:
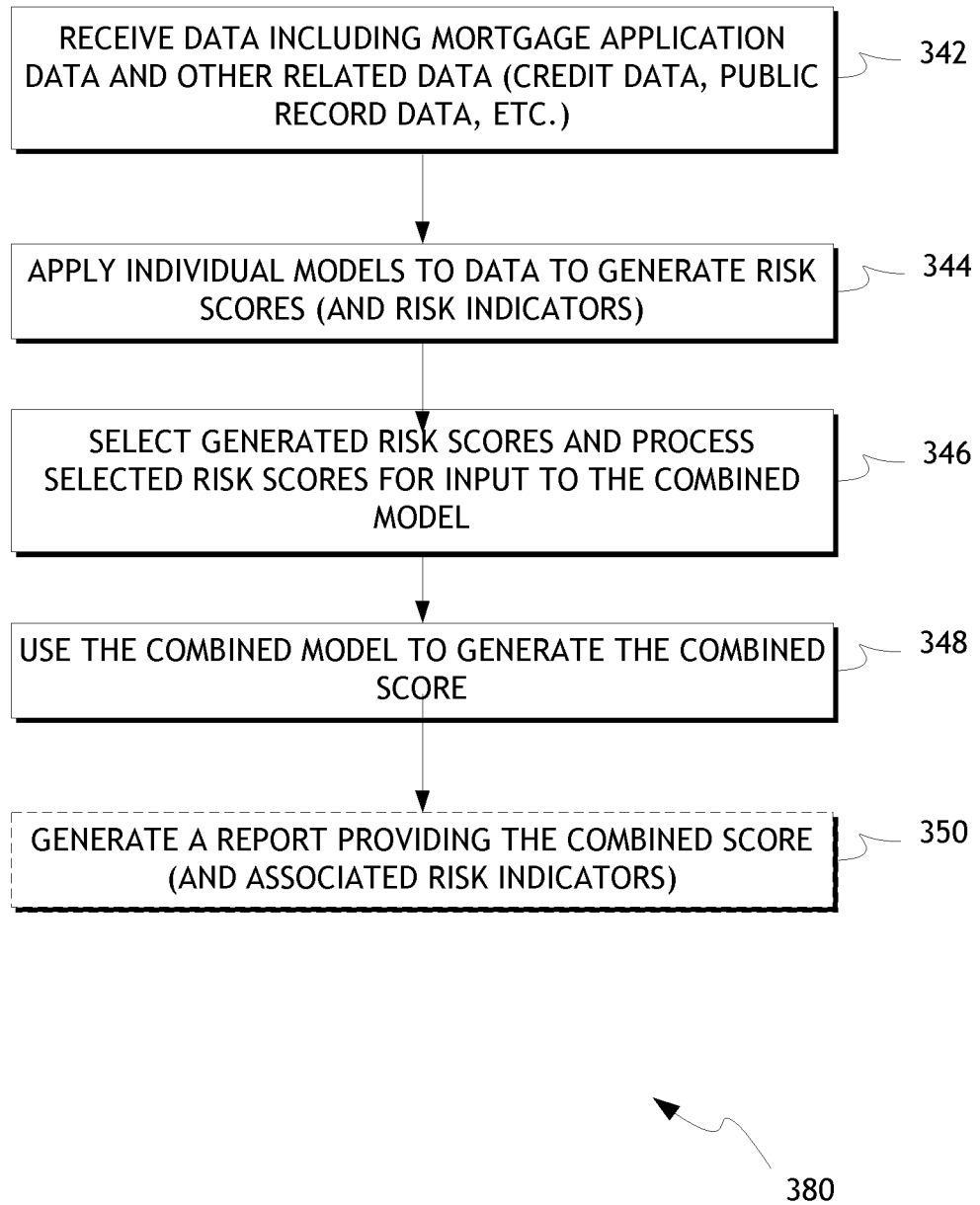
FIG. 3C is a flowchart illustrating an embodiment of a method of providing a score indicative of risks using the combined model.

FIG. 3C is a flowchart illustrating an example of a method using the combined model 112 to generate a combined risk score as indicated in block 210 of FIG. 2. The method begins at a block 342 in which the system receives data from which a combined score is to be calculated, including data associated with a particular mortgage transaction for processing as well as other data external to the transaction such as credit data, public record data, etc. The mortgage transaction data may comprise data of a mortgage application, an issued mortgage, or any other suitable loan or application. Data may be received from the loan origination system 116, the storage 104, and/or other data sources.

Next at a block 344, the system 100 (e.g., one or more processors of a computer system associated with the system 100) applies the individual models 110 to the received data to generate risk scores from the models. At a block 346, the generated scores are selected, depending on the combined model that is created or in use. In one embodiment, more than one combined model may be created, and each combined model may select a different mix of scores from the individual models. The selected scores and potentially other input data (e.g., a loan balance amount) may also be processed, i.e., combined and/or mathematically manipulated into input features that will serve as input to the combined model that is in use. At a block 348, the system 100 may use the combined model with the input features to generate the combined score. Moving to a block 350, the system 100 may optionally generate a report providing combined score and associated risk indicators. In one embodiment, the combined model 112 may selectively output the risk indicators generated by the individual models 110, e.g., based on the weighting or a model result in the combined model 112. For example, risk indicators associated with selected individual model scores used are provided as output.

FIG. 4 is an example report that is generated by the risk detection and assessment system 100 using a combined model 112. As shown, the example report includes a combined score 402 and a plurality of risk indicators 404, 406, 408, 410, and 412. In this example, the risk indicators are grouped by category. For example, risk indicators 404 are related to income/employment of the loan applicant and risk indicators 406 are related to the subject property of the mortgage. As discussed above, besides generating a combined risk score 402, the risk detection and assessment system 100 may also output these risk indicators to alert the end users as to the individual risk factors or components that contributed to the combined risk score. The example report 400 in FIG. 4 shows that the subject mortgage transaction has been classified as "high risk," and a number of specific risks are identified by the risk indicators with corresponding recommendations, so an end user can take corrective actions in view of the risks. In addition, as shown, each risk indicator may include a classification of "high risk," "moderate risk," or "low risk." In one embodiment, the classification is reflective of the contributing weight of the identified risk to the combined risk score 402.

Individual Models

Example models that may be included in the individual models 110 are further described in the following sections.

Fraud Detection Model

As discussed above, the models 110 in one embodiment include the historical transaction based fraud detection model 111, which is derived from mortgage loan data, borrower data, financial data, and other additional data. This may include data related to historical transactions. The model is built from statistical information that is stored according to groups of individuals that form clusters. In one such embodiment, fraud is identified with reference to deviation from identified clusters. In one embodiment, in addition to data associated with the mortgage applicant, embodiments of mortgage fraud detection systems may use data that is stored in association with one or more entities associated with the processing of the mortgage transaction such as brokers, appraisers, or other parties to mortgage transactions. The entities may be real persons or may refer to business associations, e.g., a particular appraiser, or an appraisal firm. Fraud generally refers to any material misrepresentation associated with a loan application and may include any misrepresentation which leads to a higher probability for the resulting loan to default, become un-sellable, or require discount in the secondary market.

Figure 5A:
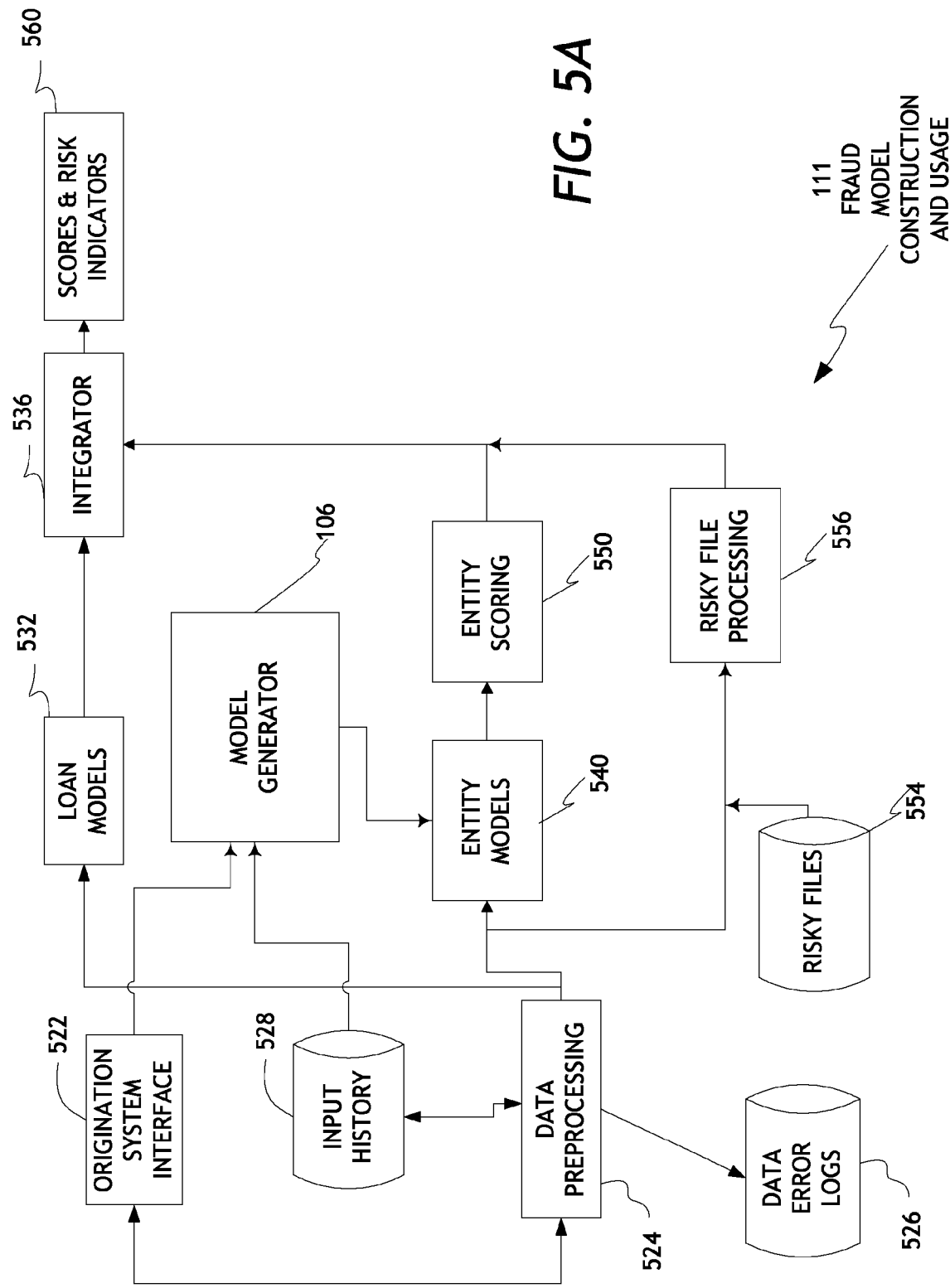
FIG. 5A is a functional block diagram illustrating the generation and execution of one model in accordance with an embodiment.

FIG. 5A is a functional block diagram further illustrating an example of fraud detection system including historical transaction based fraud detection model or models 111. The model 111 may include an origination system interface 522 providing mortgage application data to a data preprocessing module 524. The origination system interface 522 may receive data from, for example, the mortgage origination system 116 of FIG. 1. In other embodiments, the origination system interface 522 may be configured to receive data associated with funded mortgages and may be configured to interface with suitable systems other than, or in addition to, mortgage origination systems. For example, in one embodiment, the system interface 522 may be configured to receive "bid tapes" or other collections of data associated with funded mortgages for use in evaluating fraud associated with a portfolio of funded loans. In one embodiment the origination system interface 522 comprises a computer network that communicates with the origination system 116 to receive applications in real time or in batches. In one embodiment, the origination system interface 522 receives batches of applications via a data storage medium.

Fraud Detection Model: Pre-Processing of Loan Application Data

The origination system interface 522 provides application data to the data preprocessing module 524 which formats application data into data formats used internally in the model 111. For example, the origination system interface 522 may also provide data from additional sources such as credit bureaus that may be in different formats for conversion by the data preprocessing module 524 into the internal data formats of the model 111. The origination system interface 522 and preprocessing module 524 also allow at least portions of a particular embodiment of the model 111 to be used to detect fraud in different types of credit applications and for different loan originators that have varying data and data formats. A table listing examples of mortgage application data that may be used in various embodiments can be found in the previously incorporated U.S. Pat. No. 7,587,348 entitled "SYSTEM AND METHOD OF DETECTING MORTGAGE RELATED FRAUD."

Various features described with respect to the system illustrated in FIG. 5A for receiving data, preprocessing data, and processing scores output by the system may be used with any of the models 110 illustrated in FIG. 1. Moreover, any of the data described in Table 1 of the '348 patent may be used with any other of the models 110, which may also use data additional to that illustrated in Table 1 of the '348 patent.

The preprocessing module 524 may be configured to identify missing data values and provide data for those missing values to improve further processing. For example, the preprocessing module 524 may generate application data to fill missing data fields using one or more rules. Different rules may be used depending on the loan data supplier, on the particular data field, and/or on the distribution of data for a particular field. For example, for categorical fields, the most frequent value found in historical applications may be used. For numerical fields, the mean or median value of historical applications may be used. In addition, other values may be selected such as a value that is associated with the highest risk of fraud (e.g., assume the worst) or a value that is associated with the lowest risk of fraud (e.g., assume the best). In one embodiment, a sentinel value, e.g., a specific value that is indicative of a missing value to one or more fraud models may be used (allowing the fact that particular data is missing to be associated with fraud).

The preprocessing module 524 may also be configured to identify erroneous data or missing data. In one embodiment, the preprocessing module 524 extrapolates missing data based on data from similar applications, similar applicants, or using default data values. The preprocessing module 524 may perform data quality analysis such as one or more of critical error detection, anomaly detection, and data entry error detection. In one embodiment, applications failing one or more of these quality analyses may be logged to a data error log database 526.

In critical error detection, the preprocessing module 524 identifies applications that are missing data that the absence of which is likely to confound further processing. Such missing data may include, for example, appraisal value, borrower credit score, or loan amount. In one embodiment, no further processing is performed and a log or error entry is stored to the database 526 and/or provided to the loan origination system 116.

In anomaly detection, the preprocessing module 524 identifies continuous application data values that may be indicative of data entry error or of material misrepresentations. For example, high loan or appraisal amounts (e.g., above a threshold value) may be indicative of data entry error or fraud. Other anomalous data may include income or age data that is outside selected ranges. In one embodiment, such anomalous data is logged and the log provided to the origination system 116. In one embodiment, the model 111 processes applications with anomalous data. The presence of anomalous data may be logged to the database 526 and/or included in a score output or report for the corresponding application.

In data entry detection, the preprocessing module 524 identifies non-continuous data such as categories or coded data that appear to have data entry errors. For example, telephone numbers or zip codes that have too many or too few digits, incomplete social security numbers, toll free numbers as home or work numbers, or other category data that fails to conform to input specifications may be logged. The presence of anomalous data may be logged to the database 526 and/or included in a score output or report for the corresponding application.

In one embodiment, the preprocessing module 524 queries an input history database 528 to determine if the application data is indicative of a duplicate application. A duplicate may indicate either resubmission of the same application fraudulently or erroneously. Duplicates may be logged. In one embodiment, no further processing of duplicates is performed. In other embodiments, processing of duplicates continues and may be noted in the final report or score. If no duplicate is found, the application data is stored to the input history database 524 to identify future duplicates.

Fraud Detection Model: Entity Based Loan Models

The data preprocessing module 524 provides application data to one or more models for fraud scoring and processing. In one embodiment, application data is provided to one or more loan models 532 that generate data indicative of fraud based on application and applicant data. The data indicative of fraud generated by the loan models 532 may be provided to an integrator 536 that combines scores from one or more models into a final score. The data preprocessing module 524 may also provide application data to one or more entity models 540 that are configured to identify fraud based on data associated with entities involved in the processing of the application. Entity models may include models of data associated with loan brokers, loan officers or other entities involved in a loan application. More examples of such entity models 540 are illustrated with reference to FIG. 5B. Each of the entity models may output data to an entity scoring module 550 that is configured to provide a score and/or one or more risk indicators associated with the application data. The term "risk indicator" refers to data values identified with respect to one or more data fields that may be indicative of fraud. The entity scoring module 550 may provide scores associated with one or more risk indicators associated with the particular entity or application. For example, appraisal value in combination with zip code may be a risk indicator associated with an appraiser model. In one embodiment, the entity scoring module 550 provides scores and indicators to the integrator 536 to generate a combined fraud score and/or set of risk indicators.

In one embodiment, the selection of risk indicators are based on criteria such as domain knowledge, and/or correlation coefficients between entity scores and fraud rate, if entity fraud rate is available. Correlation coefficient $r_i$ between entity score $s^i$ for risk indicator i and entity fraud rate is f defined as $$r_i = \frac{\sum_{j=1}^{N}(s^i_j - \bar{s})(f_j - \bar{f})}{(N-1)SD(s^i)SD(f)}$$

where $s^i_j$ is the score for entity j on risk indicator i; and $f_j$ the fraud rate for entity j. If $r_i$ is larger than a pre-defined threshold, then the risk indicator i is selected.

In one embodiment, the entity scoring model 550 combines each of the risk indicator scores for a particular entity using a weighted average or other suitable combining calculation to generate an overall entity score. In addition, the risk indicators having higher scores may also be identified and provided to the integrator 536.

In one embodiment, the combined score for a particular entity may be determined using one or more of the following models:

An equal weight average:

$$s_c = \frac{1}{N}\sum_{i=1}^{N} s^i,$$

where N is the number of risk indicators;

A weighted average:

$$s_c = \sum_{i=1}^{N} s^i \alpha^i,$$

where N is the number of risk indicators and $\alpha^i$ is estimated based on how predictive risk indicator i is on individual loan level; a A competitive committee:

$$s_c = \frac{1}{M}\sum_{i=1}^{N} s^i,$$

where $s^i \in$(set of largest M risk indicator scores).

If entity fraud rate or entity performance data (EPD) rate is available, the fraud/EPD rate may be incorporated with entity committee score to generate the combined entity score. The entity score $s_E$ may be calculated using one of the following equations:

$S_E = S_C$, if relative entity fraud/EPD rate≤1;

$S_E = S_D + \min(\alpha^*\max(\text{absoluteFraudRate},\text{absolute EPDRate}),0.99)(998-S_D)$ if relative entity fraud/EPD rate >1 and $S_c < S_D$;

$S_E = S_C + \min(\alpha^*\max(\text{absoluteFraudRate},\text{absolute EPDRate}),0.99)(998-S_c)$ if relative entity fraud/EPD rate >1 and $S_C \geq S_D$;
where $\alpha = b^*\tan h(a^*(\max(\text{relativeFraudRate},\text{relativeEPDRate})-1))$.

The preprocessing module 524 may also provide application data to a risky file processing module 556. In addition to application data, the risky file processing module 556 is configured to receive files from a risky files database 554. "Risky" files include portions of applications that are known to be fraudulent. It has been found that fraudulent applications are often resubmitted with only insubstantial changes in application data. The risky file processing module 556 compares each application to the risky files database 554 and flags applications that appear to be resubmissions of fraudulent applications. In one embodiment, risky file data is provided to the integrator 536 for integration into a combined fraud score or report.

The integrator 536 applies weights and/or processing rules to generate one or more scores and risk indicators based on the data indicative of fraud provided by one or more of the loan models 532, the entity models 540 and entity scoring modules 560, and the risky file processing module 556. In one embodiment, the risk indicator 536 generates a single score indicative of fraud along with one or more risk indicators relevant for the particular application. Additional scores may also be provided with reference to each of the risk indicators. The integrator 536 may provide this data to a scores and risk indicators module 560 that logs the scores to an output history database 560. In one embodiment, the scores and risk indicators module 560 identifies applications for further review by the risk manager 518 of FIG. 1. Scores may be real or integer values. In one embodiment, scores are numbers in the range of 1-999. In one embodiment, thresholds are applied to one or more categories to segment scores into high and low risk categories. In one embodiment, thresholds are applied to identify applications for review by the risk manager 118. In one embodiment, risk indicators are represented as codes that are indicative of certain data fields or certain values for data fields. Risk indicators may provide information on the types of fraud and recommended actions. For example, risk indicators might include a credit score inconsistent with income, high risk geographic area, etc. Risk indicators may also be indicative of entity historical transactions, e.g., a broker trend that is indicative of fraud.

In one embodiment, the model generator 506 receives application data, entity data, and data on fraudulent and non-fraudulent applications and generates and updates models such as the entity models 540 either periodically or as new data is received.

Figure 5B:
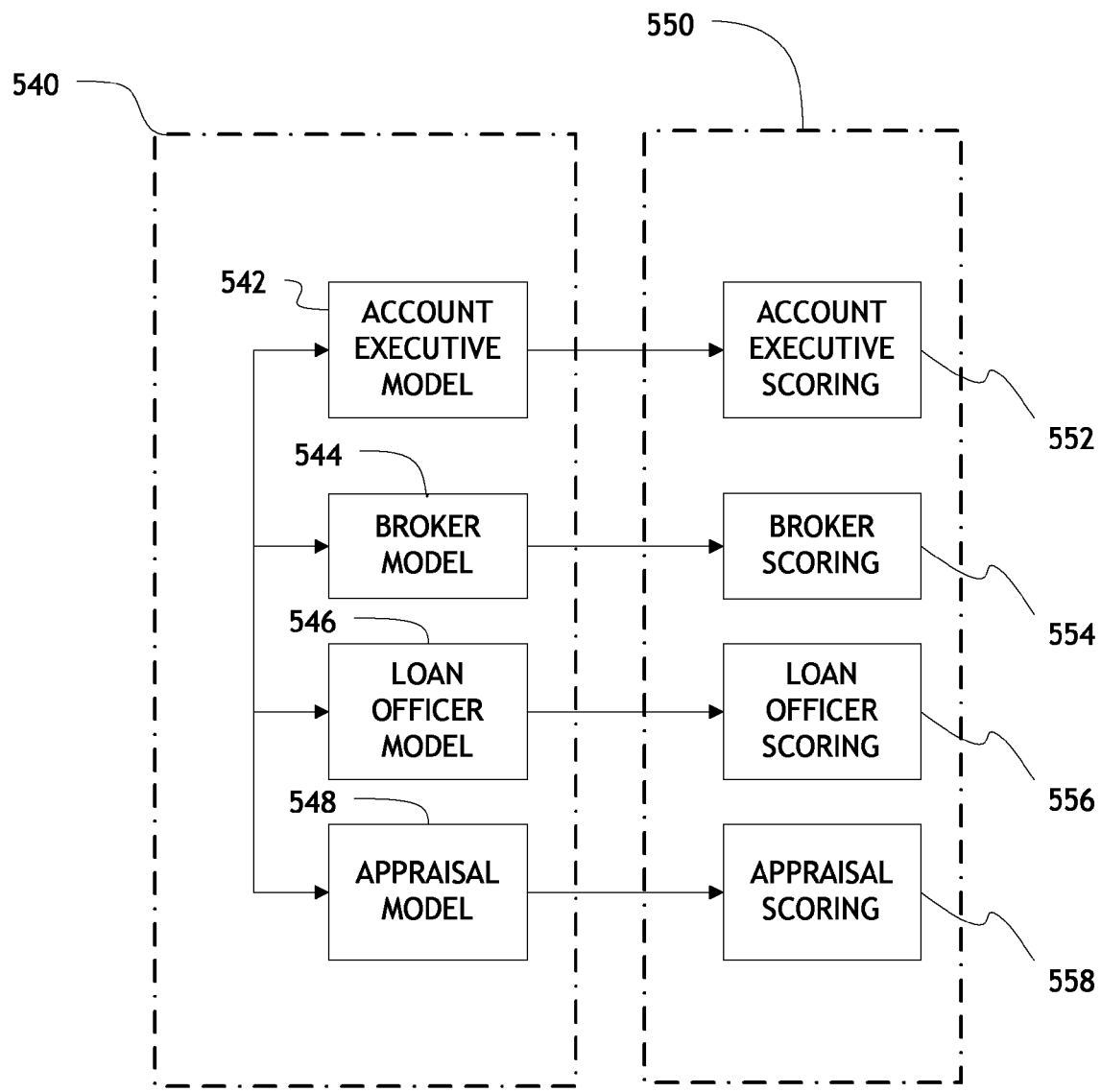
FIG. 5B is a functional block diagram illustrating example models used in the model of FIG. 5A.

FIG. 5B is a functional block diagram illustrating examples of the entity models 540 in the fraud detection model 111. It has been found that fraud detection performance can be increased by including models that operate on entities associated with a mortgage transaction that are in addition to the mortgage applicant. Scores for a number of different types of entities are calculated based on historical transaction data. The entity models may include one or more of an account executive model 542, a broker model 544, a loan officer model 546, and an appraiser (or appraisal) model 548. Embodiments may also include other entities associated with a transaction such as the lender. For example, in one embodiment, an unsupervised model, e.g., a clustering model such as k-means, is applied to risk indicators for historical transactions for each entity. A score for each risk indicator, for each entity, is calculated based on the relation of the particular entity to the clusters across the data set for the particular risk indicator.

By way of a simple example, for a risk indicator that is a single value, e.g., loan value for a broker, the difference between the loan value of each loan of the broker and the mean (assuming a simple Gaussian distribution of loan values) divided by the standard deviation of the loan values over the entire set of historical loans for all brokers might be used as a risk indicator for that risk indicator score. Embodiments that include more sophisticated clustering algorithms such as k-means may be used along with multi-dimensional risk indicators to provide for more powerful entity scores.

The corresponding entity scoring module 550 for each entity (e.g., account executive scoring module 552, broker scoring module 554, loan officer scoring module 556, and appraisal scoring module 558) may create a weighted average of the scores of a particular entity over a range of risk indicators that are relevant to a particular transaction.

Fraud Detection Model: Supervised v. Unsupervised Models

Figure 5C:
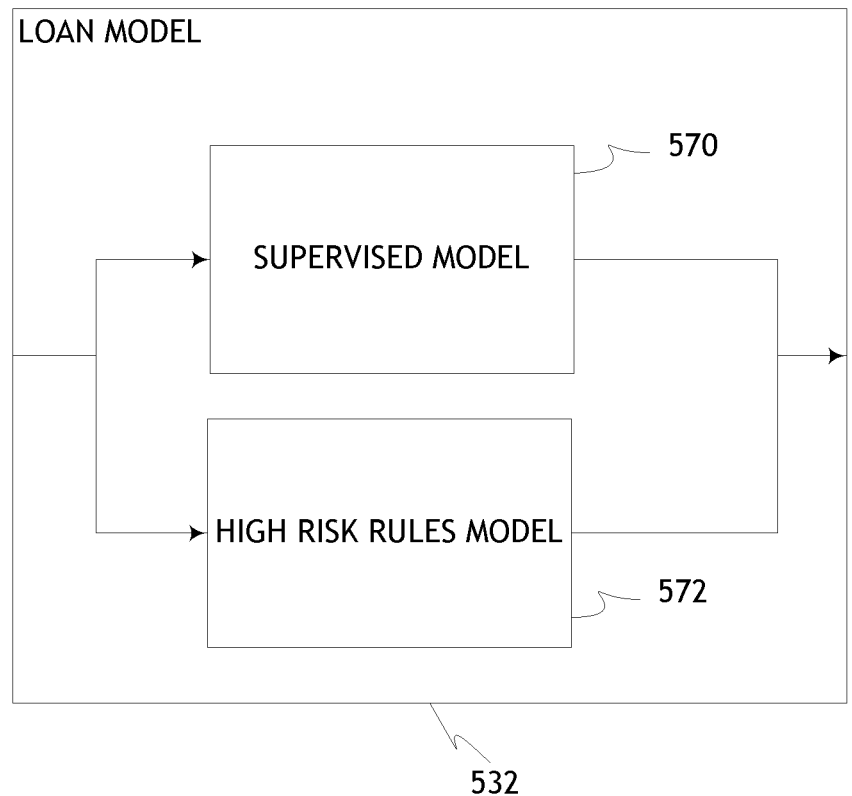
FIG. 5C is a flowchart illustrating another embodiment of model generation for use in the model of FIG. 5A.

FIG. 5C is a functional block diagram illustrating an example of the loan models 532 in the historical transaction based fraud detection model 111. In one embodiment, the loan models 532 may include one or more supervised models 570 and high risk rules models 572. Supervised models 170 are models that are generated based on training or data analysis that is based on historical transactions or applications that have been identified as fraudulent or non-fraudulent. Examples of implementations of supervised models 570 include scorecards, naïve Bayesian, decision trees, logistic regression, and neural networks. Particular embodiments may include one or more such supervised models 570.

In addition their use with the loan models 532, such models and modeling methods and systems may also be used with respect to any of the models 110 and/or as part of the combining model 112.

The high risk rules models 572 may include expert systems, decision trees, and/or classification and regression tree (CART) models. The high risk rules models 572 may include rules or trees that identify particular data patterns that are indicative of fraud. In one embodiment, the high risk rules models 572 are used to generate scores and/or risk indicators.

In one embodiment, the rules, including selected data fields and condition parameters, are developed using the historical data used to develop the loan model 570. A set of high risk rule models 572 may be selected to include rules that have low firing rate and high hit rate. In one embodiment, when a rule i is fired, it outputs a score: $S_{rule}^{i}$. The score represents the fraud risk associated to the rule. The score may be a function of $$S_{rule}^{i} = f(\text{hitRateOfRule}^{i}, \text{firingRateofRule}^{i}, \text{scoreDistributionOfLoanAppModel}),$$

and $S_{rule} = \max(S_{rule}^{1} \ldots S_{rule}^{N})$.

In one embodiment, the loan models 570 and 572 are updated when new versions of the model 111 are released into operation. In another embodiment, the supervised models 170 and the high risk rules models 572 are updated automatically. In addition, the supervised models 570 and the high risk rules models 572 may also be updated such as when new or modified data features or other model parameters are received.

Fraud Detection Model: Model Generation Processes

Figure 6A:
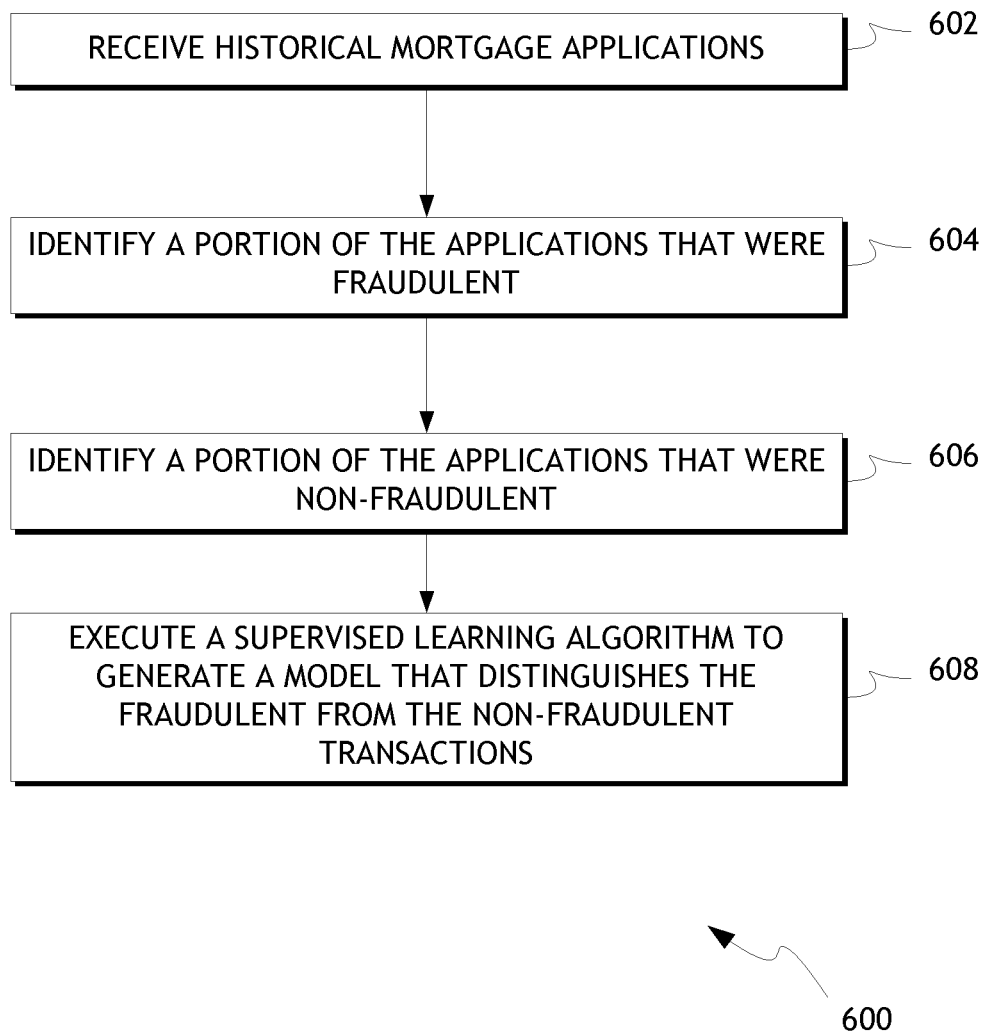
FIG. 6A is a flowchart illustrating a supervised method of generating a model for use in a model that is useable in an embodiment of the risk detection and assessment system.

FIG. 6A is a flowchart illustrating an example of generating the loan models 132 in the model 111. The flowchart illustrates a method 600 of performing the block 202 of FIG. 2. Similar techniques may be applied to any of the models 110. Supervised learning algorithms identify a relationship between input features and target variables based on training data. In one embodiment, the target variables comprise the probability of fraud. Generally, the models used may depend on the size of the data and how complex a problem is. For example, if the fraudulent exemplars in historical data are less than about 5000 in number, smaller and simpler models may be used, so a robust model parameter estimation can be supported by the data size. The method 600 begins at a block 602 in which the model generator 106 receives historical mortgage data. The model generator 106 may extract and convert client historical data according to internal development data specifications, perform data analysis to determine data quality and availability, and rectify anomalies, such as missing data, invalid data, or possible data entry errors similar to that described above with reference to preprocessing module 524 of FIG. 5A.

In addition, the model generator 106 may perform feature extraction including identifying predictive input variables for fraud detection models. The model generator 106 may use domain knowledge and mathematical equations applied to single or combined raw input data fields to identify predictive features. Raw data fields may be combined and transformed into discriminative features. Feature extraction may be performed based on the types of models for which the features are to be used. For example, linear models such as logistic regression and linear regression, work best when the relationships between input features and the target are linear. If the relationship is non-linear, proper transformation functions may be applied to convert such data to a linear function. In one embodiment, the model generator 106 selects features from a library of features for use in particular models. The selection of features may be determined by availability of data fields, and the usefulness of a feature for the particular data set and problem. Embodiments may use techniques such as filter and wrapper approaches, including information theory, stepwise regression, sensitivity analysis, data mining, or other data driven techniques for feature selection.

In one embodiment, the model generator 106 may segment the data into subsets to better model input data. For example, if subsets of a data set are identified with significantly distinct behavior, special models designed especially for these subsets normally outperform a general fit-all model. In one embodiment, a prior knowledge of data can be used to segment the data for generation of models. For example, in one embodiment, data is segregated geographically so that, for example, regional differences in home prices and lending practices do not confound fraud detection. In other embodiments, data driven techniques, e.g., unsupervised techniques such as clustering, are used to identify data segments that may benefit from a separate supervised model.

Proceeding to a block 604, the model generator 106 identifies a portion of the applications in the received application data (or segment of that data) that were fraudulent. In one embodiment, the origination system interface 522 provides this labeling. Moving to a block 606, the model generator 106 identifies a portion of the applications that were non-fraudulent. Next at a block 608, the model generator 106 generates a model such as the supervised model 570 using a supervised learning algorithm to generate a model that distinguishes the fraudulent from the non-fraudulent transactions. In one embodiment, CART or other suitable model generation algorithms are applied to at least a portion of the data to generate the high risk rules models 572.

In one embodiment, historical data is split into multiple non-overlapped data sets. These multiple data sets are used for model generation and performance evaluation. For example, to train a neural network model, the data may be split into three sets, training set 1, training set 2, and validation. The training set 1 is used to train the neural network. The training set 2 is used during training to ensure the learning converge properly and to reduce overfitting to the training set 1. The validation set is used to evaluate the trained model performance. Supervised models may include one or more of scorecards, naïve Bayesian, decision trees, logistic regression, and neural networks. Such techniques may also be applied to generate at least a portion of the combining model 112.

Figure 6B:
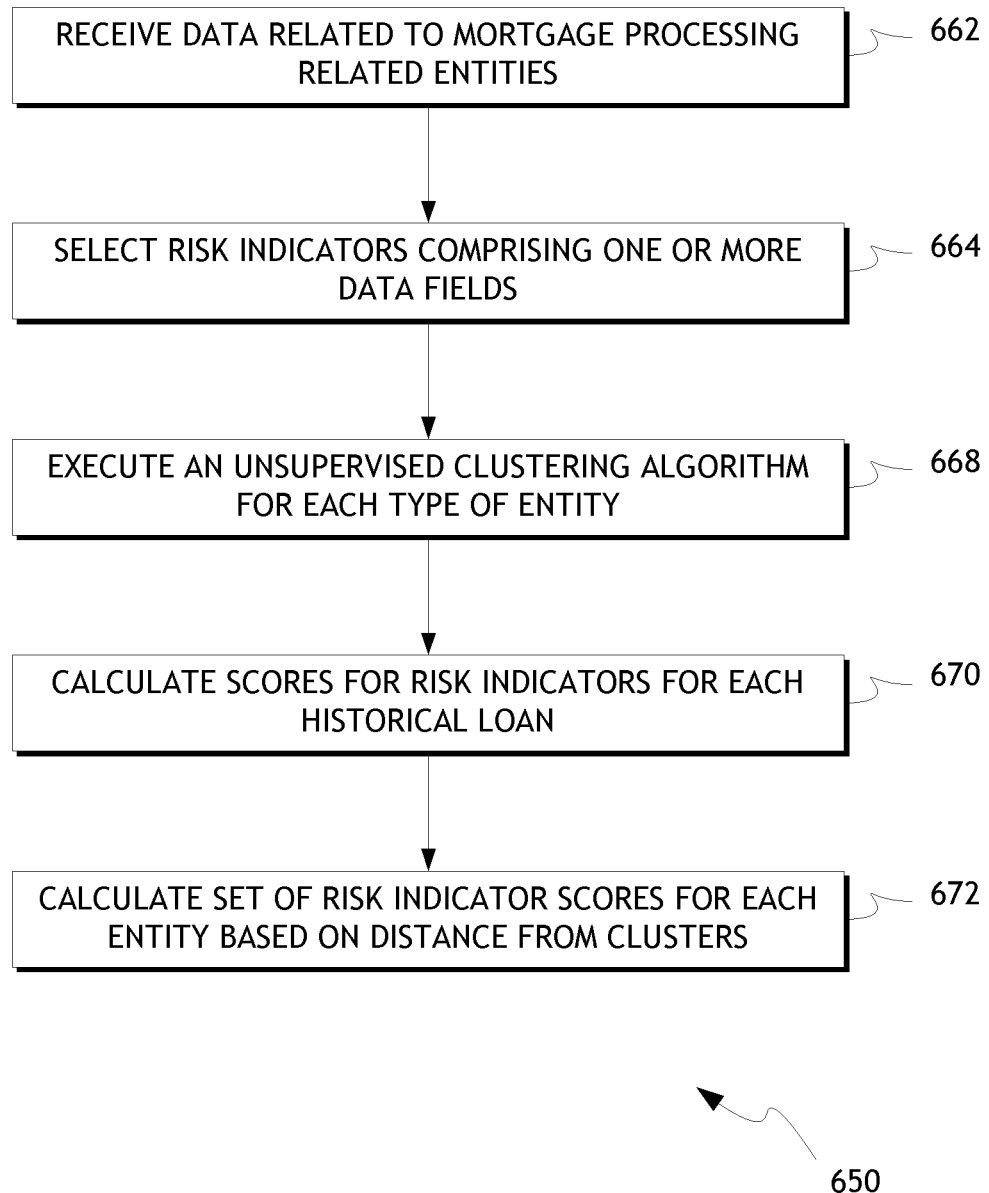
FIG. 6B is a flowchart illustrating an unsupervised method of generating a model for use in a model that is useable in an embodiment of the risk detection and assessment system.

FIG. 6B is a flowchart illustrating an example of a method 650 of performing the block 202 of FIG. 2. The illustrated example process generates entity models 540 in the historical transaction based fraud detection model 111. The method 650 begins at a block 662 in which the model generator 106 receives historical mortgage applications and data related to mortgage processing related entities such as an account executive, a broker, a loan officer, or an appraiser. Moving to a block 664, the model generator 106 selects risk indicators comprising one or more of the input data fields. In one embodiment, expert input is used to select the risk indicators for each type of entity to be modeled. In other embodiments, data driven techniques such as data mining are used to identify risk indicators.

Next at a block 668, the model generator 106 performs an unsupervised clustering algorithm such as k-means for each risk indicator for each type of entity. Moving to a block 680, the model generator 106 calculates scores for risk indicators for each received historical loan based on the data distance from data clusters identified by the clustering algorithm. For example, in a simple one cluster model where the data is distributed in a normal or Gaussian distribution, the distance may be a distance from the mean value. The distance/score may be adjusted based on the distribution of data for the risk indicator, e.g., based on the standard deviation in a simple normal distribution. Moving to a block 672, scores for each risk indicator and each entity are calculated based on model, such as a weighted average of each of the applications associated with each entity. Other embodiments may use other models.

Fraud Detection Model: Model Score Calculation

Figure 7:
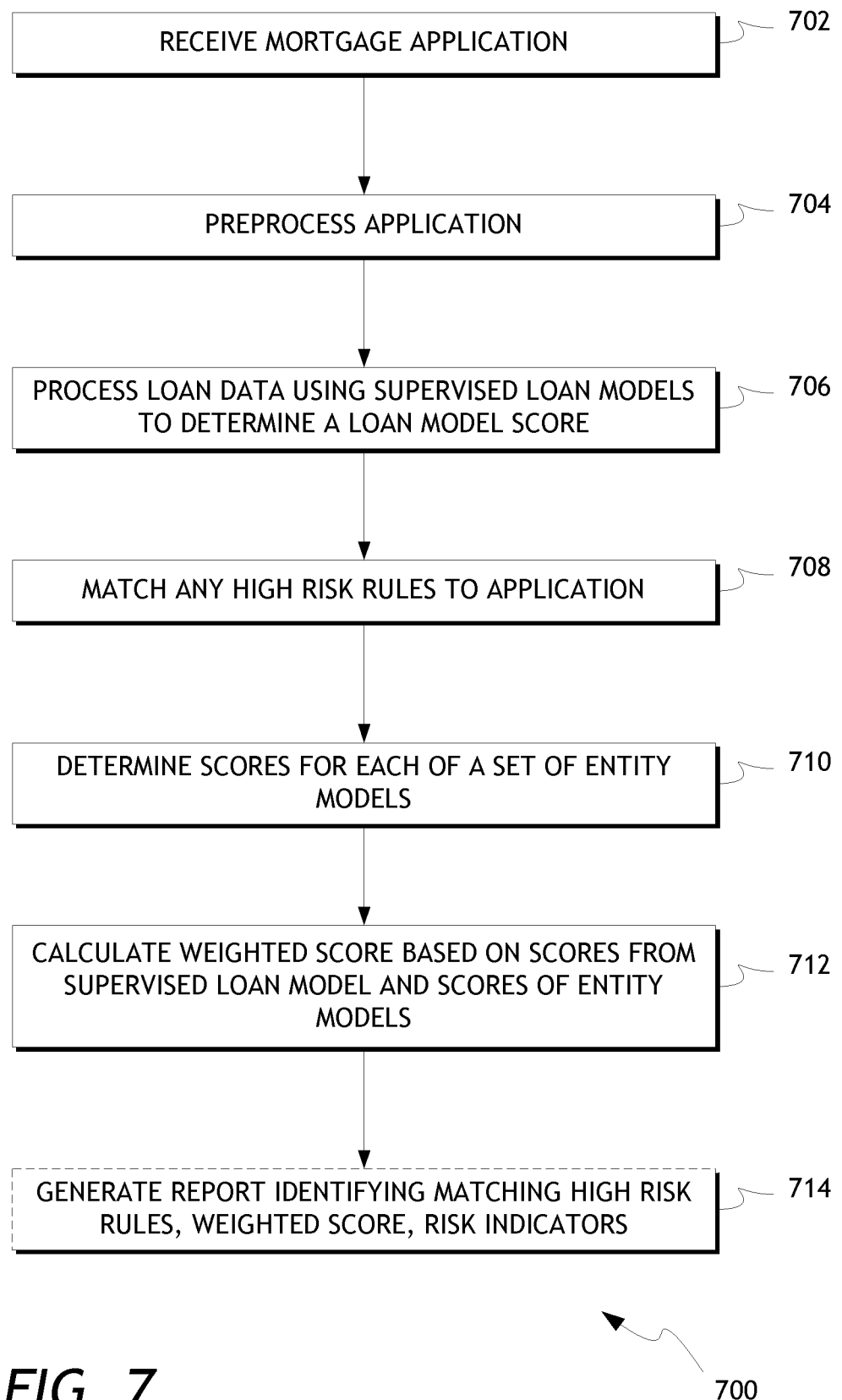
FIG. 7 is a flowchart illustrating an example of using a model based on historical transactions to generate a score indicative of fraud risk for use as part of a combined model in accordance with an embodiment.

FIG. 7 is a flowchart illustrating an embodiment of a method of generating a model score using the fraud model 111. The method 700 begins at a block 702 in which the origination system interface 522 receives loan application data. Next at a block 704, the data preprocessing module 524 preprocesses the application data as discussed above with reference to FIG. 5A.

Moving to a block 706, the application data is applied to the supervised loan models 570 which provide a score indicative of the relative likelihood or probability of fraud to the integrator 536. In one embodiment, the supervised loan models 570 may also provide risk indicators. Next at a block 808, the high risk rules model 572 is applied to the application to generate one or more risk indicators, and/or additional scores indicative of fraud. Moving to a block 710, the application data is applied to one or more of the entity models 540 to generate additional scores and risk indicators associated with the corresponding entities of the models 540 associated with the transaction.

Next at a block 712, the integrator 536 calculates a weighted score and risk indicators based on scores and risk indicators from the supervised loan model 570, the high risk rules model 572, and scores of entity models 540. In one embodiment, the integrator 536 includes an additional model, e.g., a trained supervised model, that combines the various scores, weights, and risk factors provided by the models 570, 572, and 540.

Moving to a block 714, the scores and risk indicators module 560 and the score review report module 562 generate a report providing a weighted score along with one or more selected risk indicators. The selected risk indicators may include explanations of potential types of frauds and recommendations for action.

Multi-Component Risk Model

Figure 8:
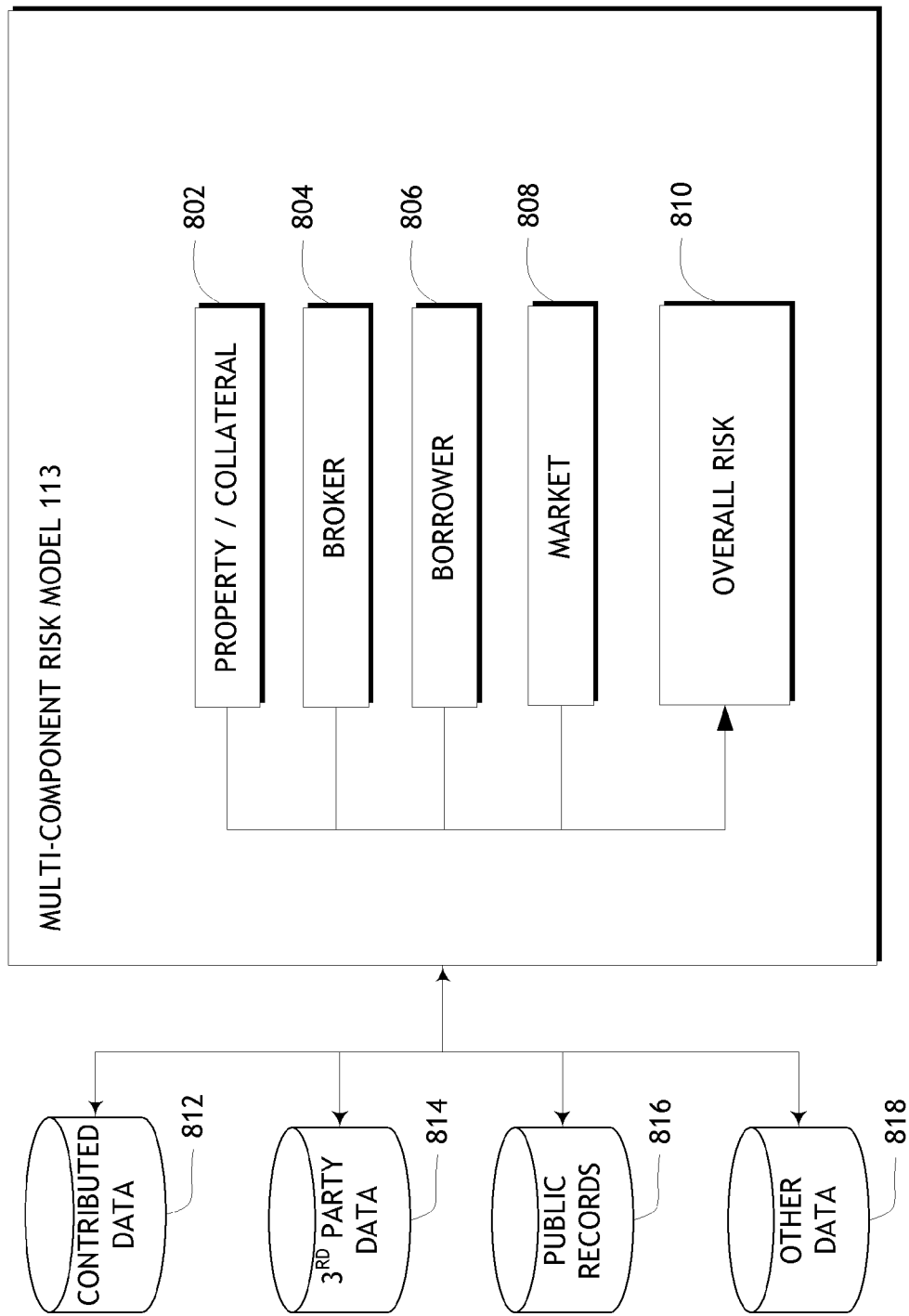
FIG. 8 is a functional block diagram illustrating components of a multi-component risk model that is useable as part of the overall combined model in accordance with an embodiment.

FIG. 8 is a block diagram illustrating an embodiment of the multi-component risk model 113 for evaluating risks associated with mortgage lending. As shown, the multi-component risk model 113 may include several components, including a property/collateral component 802, a broker component 804, a borrower component 806, and a market component 808. The multi-component risk model 113 may also take, as input, data from a number of data sources, including lender contributed data 812 (e.g., mortgage data reported by lenders), third party data 814 (e.g., credit data, financial data, employment data), public records data 816 (e.g., property records), and other data 818.

In one embodiment, the property/collateral component 802 is configured to assess a risk of the subject property/collateral (e.g., an early payment default (90+ days delinquent in the first year)). Other example risks such the risk of a default over a longer time period may be assessed as well. The property/collateral component 802 may be based on an evaluation of public records (e.g., assessor and recorder records) and property characteristic data (e.g., size of property, improvements, location, etc.). Beyond evaluating data relating to the subject property/collateral, the property/collateral component 802 may also evaluate data at a neighborhood level, assessing pricing dynamics, foreclosure dynamics, buy and sell trends, and/or valuation trends of nearby properties. The property/collateral component 802 may also base its risk score output on an automated value model (AVM) and/or a home price index (HPI) model. In one embodiment, based on a combination of these evaluations, the property/collateral component 802 is configured to render a score for a given property involved in a mortgage application. In one embodiment, the property/collateral risk score assesses a risk associated with over-valuation and fraudulent valuation of the subject property/collateral. In other embodiments, the property/collateral risk score may be used in evaluating mortgage applications and/or funded loans by an investment bank or as part of due diligence of a loan portfolio.

The broker component 804 may provide a risk score that assesses a risk associated with a particular broker. In one embodiment, at least a portion of the property/collateral model 802 is applied to loan data contributed by lenders (contributed data 812). Since the contributed data 812 identify the brokers associated with the loans, risks for the individual brokers may be calculated by aggregating the property/collateral risk scores of the properties associated with loans from the individual brokers. In one embodiment, the broker risk score predicts the risk of early default and/or fraud.

Likewise, the borrower component 806 may provide a risk score that assesses a risk associated with a particular borrower. In one embodiment, the borrower component 806 searches public records (e.g., assessor and recorder records) data 816 to find previous addresses associated with a borrower in question, and at least a portion of the property/collateral model 802 is then applied to properties associated with these previous addresses. In addition, the borrower component 806 may also evaluate the third party data 814 including the borrower's credit data, and any other proprietary data and/or public record data associated with the borrower. The borrower's risk score that is generated as a result of these evaluations predicts the default risk associated with the particular borrower.

Finally, the market component 808 may provide a risk score on the real property market in which the subject property is located. In one embodiment, the market component 808 applies at least a portion of the property/collateral model component 802 to properties within a specific geographic area (e.g., properties in the same ZIP code). In addition the market score 808 may also evaluate public records data, any other proprietary data sources, and potentially derivate works of these data sources.

In one embodiment, the risk scores from the four components are combined to provide an overall risk score 810. In one embodiment, one or more of these five risk scores (the property/collateral risk score, the broker risk score, the broker risk score, the market risk score, and the overall risk score) are provided as input to the combined model 112 to generate a combined score in accordance with the embodiments shown in FIGS. 1A-4. In addition, as with other individual models 110, the multi-component risk model 113 may provide risk indicators to the combined model so that specific risks may be displayed with the combined score. For example, risk indicators related to a high market risk score may be provided to the combined model 112 so that a user may be alerted to the fact that one factor contributing to a high combined risk score is that the local property market is at a high risk of price decline.

Early Payment Default Model

As referenced, the early payment default (EPD) model 115 may be used to create the combined model 112 and the output of the EPD model 115 (e.g., an EPD risk score ranging from 1-999) may be selected and processed into an input feature to the combined model 112. In various embodiments, the EPD model 115 employs statistical pattern recognition to generate a score designed to assess the risk of early payment default in mortgage applications and loans (e.g., default within the first few months of repayment period). In one embodiment, the EPD model 115 finds early payment default risk based on historical patterns of both performing and non-performing mortgage loans from the a database of historical loans. In one embodiment, the EPD model operates in a similar fashion as the fraud detection model 111. For example, a process similar to that shown in FIG. 7 can be employed in the EPD model 115, wherein steps 706, 708, and 710 would be customized and directed to detecting early payment default. As a further example, embodiments of the EPD model can be generated using a supervised learning model as described above in conjunction with FIG. 5C (step 570), using example loans with and without early payment default to effectively learn how to generate a score that represents the likelihood of a loan defaulting during a particular portion of the life of the loan.

Additional risk factors can be included in the supervisory models used for EPD detection native to fraud detection. Those factors can broadly be defined as: borrower's risk, geographic risk, borrower's affordability, and property valuation risk. Borrower's risk can include information such as a credit score, payment history, employment information, tenure in current employment position, debt, income, occupancy, etc. This information can be used to evaluate the risk factors associated with the borrower. For example, if the buyer has a risky credit score or employment, then he or she may be a higher risk for EPD and the EPD model 115 can take this into account. Property appraisal information and the geographic location of the property can also be used to determine the EPD risk. For example, the property may be overvalued relative to other properties in the area and/or the area may have a high rate of defaults. Thus, such information can be used in the EPD model 115 to determine a geographic risk factor and/or a property valuation risk factor. These risk factors may be output by the EPD model 115 as risk indicators, so that risk factors that provide significant contributions can be identified in a user display/report such as the one shown in FIG. 4.

Figure 9:
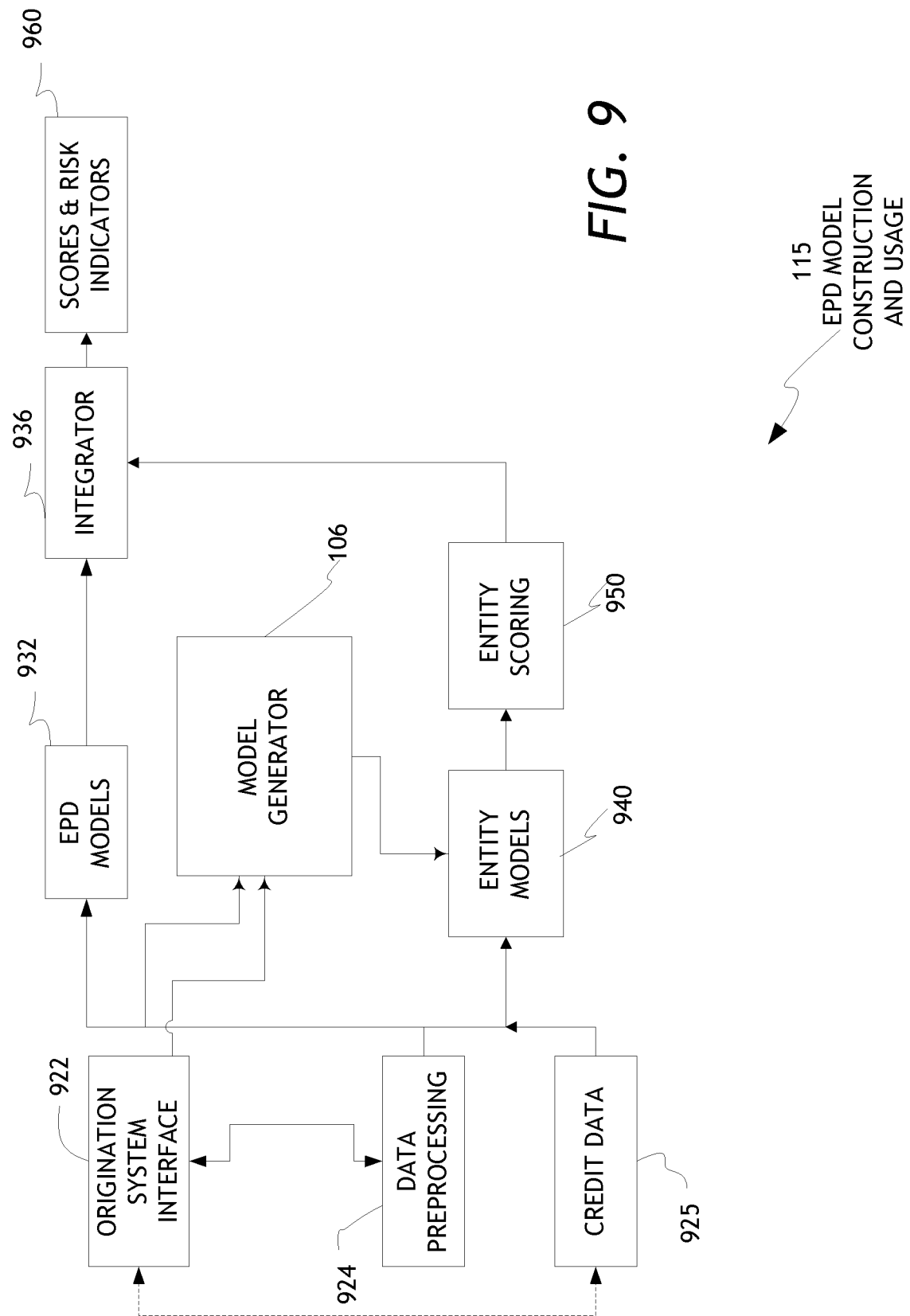
FIG. 9 is a functional block diagram illustrating the generation and execution of another model that is useable as part of the overall combined model in accordance with an embodiment.

FIG. 9 is a functional block diagram illustrating an example of the EPD model 115. As can be seen, the configuration of EPD model 115 is similar to that of the fraud detection model 111 as shown in FIG. 5A, with EPD models 932 replacing the loan models 532 and the introduction of credit data 925.

As shown, an origination system interface 922 provides mortgage application data to a data preprocessing module 924. The interface 922 may receive data from the mortgage origination system 116 as shown in FIG. 1A. A credit data system 925 can be configured to receive applicant credit data from one or more credit bureaus or from the lender such as via the loan origination system interface 922 to store and provide that data to the EPD model.

The origination system interface 922 can provide application data to the data preprocessing module 924, which formats application data into data formats used internally by the model 115. The data preprocessing module 924 can provide application data to one or more models for EPD risk scoring and processing. In one embodiment, application data is provided to one or more EPD models 932 that generate data indicative of EPD risk based on application and applicant data. The data indicative of EPD risk generated by the EPD models 932 can be provided to an integrator 936 that combines scores from one or more models into a final score. The data preprocessing module 924 can also provide application data to one or more entity models 940 that are configured to identify EPD risk based on data associated with entities involved in the processing of the application. Entity models can include models of data associated with loan brokers, loan officers or other entities involved in a loan application. Additional examples of such entity models 940 are illustrated with reference to FIG. 5B. Each of the entity models can output data to an entity scoring module 950 that is configured to provide a score and/or one or more risk indicators associated with the application data.

Optionally, the entity scoring module 950 can provide scores associated with one or more risk indicators associated with the particular entity or application. For example, appraisal value in combination with zip code can be a risk indicator associated with an EPD model. In one embodiment, the entity scoring module 950 provides scores and indicators to the integrator 936 to generate a combined EPD risk score and/or set of risk indicators.

The integrator 936 can be configured to apply weights and/or processing rules to generate one or more scores and risk indicators based on the data indicative of EPD risk provided by one or more of the EPD models 932, the entity models 940 and entity scoring modules 960. In one embodiment, the risk indicator 936 can generate a single score indicative of EPD risk along with one or more risk indicators relevant for the particular application. Additional scores can also be provided with reference to each of the risk indicators. The integrator 936 can provide this data to a scores and risk indicators module 960. In one embodiment, scores are numbers in the range of 1-999. As described above with reference to FIG. 1A, the scores and risk indicators are provided to the combined model 112 for calculation of the combined risk score. The risk indicators are presented to the user, for example, via an example interface shown in FIG. 4, to denote risks factors that provide significant contribution to the combined score. In one embodiment, risk indicators are represented as codes that are indicative of certain data fields or certain values for data fields. Risk indicators can provide information on the types of EPD risk and recommended actions. For example, risk indicators may include a credit score that falls within high % of default ranges, a high risk of default geographic area, etc. Risk indicators can also be indicative of entity historical transactions, e.g., a CLTV percentage that is indicative of EPD risk.

As previously stated, additional description of the configuration set forth in FIG. 9 and other details of the EPD model 115 are disclosed in the above referenced U.S. Patent Publication No. 2009/0099959, filed on Oct. 6, 2008 and entitled "METHODS AND SYSTEMS OF PREDICTING MORTGAGE PAYMENT RISK."

Income Related Fraud Detection Model

Figure 10:
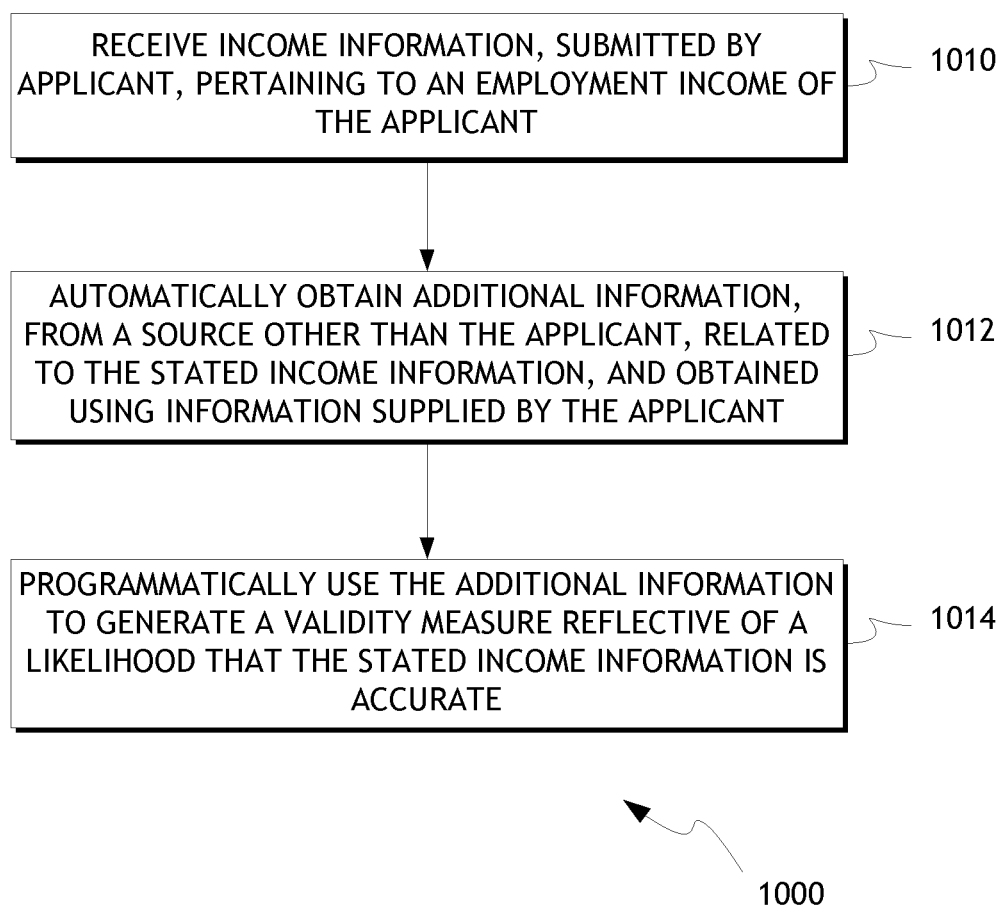
FIG. 10 is a flowchart illustrating an example of using a model for detecting fraud that is based on applicant income to generate a validity measure for use as part of a combined model in accordance with an embodiment.

FIG. 10 is a flowchart illustrating embodiment of the model 117 for detecting fraud based on applicant income for use with other models as in an embodiment illustrated in FIGS. 1A-4. The method begins at a block 1010 in which the model 117 receives stated income information submitted by the applicant and pertaining to an employment income of the applicant. Next at a block 1012, the model 117 automatically obtains additional information from a source other than the applicant. The additional information is related to the stated income information and is obtained using information supplied by the applicant. In one embodiment, the additional information comprises typical income levels in at least one neighborhood of residence of the applicant. In one embodiment, the model 117 automatically generates one or more links to a search service, wherein the links correspond to search terms related to the applicant's stated income.

Moving to a block 1014, the model 117 programmatically uses the additional information to generate a validity measure reflective of a likelihood that the stated income information is accurate. In one embodiment, the model 117 automatically uses employment information supplied by the applicant in a free-form format to automatically select an employment category of the applicant, and uses the selected employment category to assess the stated income information. In one embodiment, the model 117 generates an estimated income level of the applicant based, at least in part, on employment and residence information of the applicant, and compares the estimated income level to the stated income information. In one embodiment, the model 117 automatically gathers information indicative of incomes of others having similar employment to that of the applicant. In one such embodiment, the model 117 optionally programmatically generates a report which includes the validity measure and information regarding incomes of others having similar employment.

In one embodiment, the model 117 uses information supplied by the applicant to automatically identify at least one previous residence address of the applicant, and to obtain information regarding a typical income level in a neighborhood corresponding to said previous residence address. In one embodiment, the at least one previous residence address is automatically obtained using a social security number supplied by the applicant.

The model 117 may also incorporate other component models. For example, in one embodiment, the model 117 is configured to receive an indication of the income stated by the applicant, query a database to obtain information related to a source or sources of the stated income, and determine an employment profile corresponding to the income source or sources. The employment profile may be based at least partially on the obtained information. The model 117 may further determine a representative income reflective of incomes of others having a comparable employment profile and calculate a validity measure reflective of a degree of correspondence between the stated income and the representative income. The information indicative of the source or sources of income may comprise one or more of business address, business telephone number, co-worker names, type of business, and business name. The employment profile may comprise at least one of the following: occupation, job position, length of experience, salary and location. The model 117 may determine a representative income by determining a range of incomes of others having a comparable employment profile. The range may be bounded by selected percentiles of a group of the others. In one embodiment, the model 117 communicates with at least one third party source of information and wherein the determining is based at least in part on the third party information. Additional alternative embodiments and details of model 117 are disclosed in U.S. patent application Ser. No. 11/864,606, filed on Sep. 28, 2007, the disclosure of which has been incorporated by reference above.

Implementations/Alternative Embodiments

The various functional blocks 106, 110, 111, 112, 113, 115, 117, 119, 122, 126, and 128 shown in FIG. 1A may be implemented in computer hardware (e.g., one or more computers, computer processors, or other units of computing machinery) programmed with executable code modules. The code modules may be stored on any type or types of computer storage devices or computer-readable media (e.g., hard disk drives, optical disk drives, solid state storage devices, etc.), and may embody (i.e., direct the computer hardware to perform) the various steps and functions described herein. In some embodiments, the various code modules of the system 110 may be distributed across multiple distinct computers or computing devices that are interconnected on a network, and which collectively operate as a risk assessment computing system or machine. The scores and other data generated by the various models, including the combined models 112, may be stored by transforming the electrical, magnetic, or other states of physical storage devices. Although preferably implemented in program modules, some components of the system 110, such as specific models, may alternatively be implemented in-whole or in-part in application-specific circuitry (e.g., an ASIC or FPGA) or other special purpose hardware.

It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially. Further, in some embodiments, certain components of the disclosed systems may be omitted.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

CONCLUSION

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A system for detecting and assessing lending risks, the system comprising:
   a computer system comprising one or more computing devices, the computer system programmed, via executable code modules, to implement:
   a combined risk detection model for detecting and assessing data indicative of a plurality of risks in loan application data, the combined risk detection model configured to receive as input a plurality of input features extracted from two or more of a plurality of risk detection models, the plurality of risk detection models comprising:
      a first risk detection model configured to generate a first risk model score that is indicative of the presence of a first risk in the loan application data;
      a second risk detection model configured to generate a second risk model score that is indicative of the presence of a second risk in the loan application data; and
      a third risk detection model configured to generate a third risk model score that is indicative of the presence of a third risk in the loan application data, wherein the first risk, the second risk, and the third risk are different risks,
   wherein the computer system is further programmed to:
      determine combinability of the plurality of risk detection models based at least partly on evaluating predictive performance of scores from one or more combinations of the risk detection models against historical transactions data;
      extract input features from the risk detection models that are determined to be combinable, the input features created from a mathematical combination of the scores and additional data, wherein the input features are extracted from the two or more risk detection models by mathematically combining scores from the plurality of risk detection models for input into the combined risk detection model, the input features being selected as based at least in part on a comparison of the predictive performance of the plurality of risk detection models and a selection of a modeling method used to construct the combined risk detection model; and
      generate a composite risk score based at least in part on the scores from the models determined to be combinable and the extracted input features; and
   a score reporting module that reports the composite risk score generated by the combined risk detection model.

2. The system of claim 1, wherein the input features are extracted from one or more of: scores from the plurality of risk detection models or additional data related to the loan application not output by the plurality of risk detection models.

3. The system of claim 2, wherein the additional data related to the loan application not output by the plurality of risk detection models comprises a loan amount.

4. The system of claim 1, wherein the first risk detection model comprises a fraud model, and wherein the second risk detection model comprises a fraud model.

5. The system of claim 1, wherein the first risk detection model comprises a default risk model, and wherein the second risk detection model comprises a default risk model.

6. The system of claim 1, wherein the first risk detection model comprises a fraud model, wherein the second risk detection model comprises a multi-component risk model, and wherein the third risk detection model comprises a default risk model.

7. The system of claim 1, wherein a modeling method used to construct the combined risk detection model comprises one of: linear regression, logical regression, neural networks, support vector machines, or decision trees generated using a machine learning algorithm that uses a tree-like graph to predict an outcome.

8. The system of claim 1, wherein the plurality of risk detection models are generated based at least in part on segmentation of the historical transactions data.

9. The system of claim 8, wherein the segmentation corresponds to geographic characteristics associated with the historical transactions data.

10. The system of claim 8, wherein the segmentation corresponds to a clustering analysis of the historical transactions data.

11. The system of claim 1, wherein the first risk detection model comprises an income fraud detection model that detects the presence of data indicative of fraud in income data within the loan application data, the income fraud detection model configured to generate an income fraud score indicative of fraud in the income data.

12. A computerized method of detecting and assessing mortgage lending risks, the method comprising:
   receiving, on a physical computer processor, mortgage transaction data that includes loan application data and historical transactions data;
   determining, on a physical computer processor, combinability of a plurality of risk detection models, the determining comprising determining predictive performance of scores from one or more combinations of the risk detection models as compared to the historical transactions data, wherein the plurality of risk detection models further comprise two or more of:
      a first risk detection model configured to generate a first risk model score that is indicative of the presence of a first risk in the loan application data;
      a second risk detection model configured to generate a second risk model score that is indicative of the presence of a second risk in the loan application data; or
      a third risk detection model configured to generate a third risk model score that is indicative of the presence of a third risk in the loan application data, wherein the first risk, the second risk, and the third risk are different risks;
   extracting, on a physical computer processor, input features from the risk detection models that are determined to be combinable, the input features created from a mathematical combination of the scores and additional data, wherein the input features are extracted from the two or more risk detection models by mathematically combining scores from the plurality of risk detection models for input into a combined risk detection model, the input features being selected as based at least in part on a comparison of the predictive performance of the plurality of risk detection models and a selection of a modeling method used to construct the combined risk detection model;
   applying, on a physical computer processor, the combined risk detection model to the mortgage transaction data to generate a composite risk score, wherein the combined risk detection model is configured to receive the extracted input features from the plurality of risk detection models determined to be combinable and mortgage transaction data not output by the risk detection models, the extracted input features further being selected as based at least in part on a modeling method used to construct the combined risk detection model; and
   generating, on a physical computer processor, a report including the composite risk score generated by the combined risk detection model.

13. The method of claim 12, wherein the determining of the combinability of the plurality of risk detection models is based at least in part on the correlation of the results of applying the plurality of risk detection models to historical transaction data.

14. The method of claim 13, wherein the correlation is based at least in part on a measure of the similarity of the results among the plurality of risk detection models.

15. The method of claim 12, wherein the input features are selected by:
   applying each of the plurality of risk detection models to data to generate a score for each risk detection model, the data comprising historical mortgage transaction data;
   identifying an interaction among scores from the plurality of risk detection models; and
   using the interaction as a basis for the selection of the input features.

16. The method of claim 12, wherein the input features are selected by:
   applying each of the plurality of risk detection models to data to generate a score for each risk detection model, the data comprising historical mortgage transaction data;
   performing a swap analysis on the scores from applying the plurality of risk detection models to the data; and
   using the result of the swap analysis as a basis for the selection of the input features.

17. The method of claim 12, wherein the first risk detection model comprises a fraud model, and wherein the second risk detection model comprises a fraud model.

18. The method of claim 12, wherein the first risk detection model comprises a default risk model, and wherein the second risk detection model comprises a default risk model.

19. The method of claim 12, wherein the plurality of risk detection models are generated based at least in part on segmentation of the historical transactions data.

* * * * *